United States Patent [19]

Namba et al.

[11] Patent Number: 4,735,889
[45] Date of Patent: Apr. 5, 1988

[54] OPTICAL RECORDING MEDIUM

[75] Inventors: Kenryo Namba; Shigeru Asami; Toshiki Aoi; Kazuo Takahashi; Akihiko Kuroiwa, all of Tokyo, Japan

[73] Assignee: TDK Corporation, Tokyo, Japan

[21] Appl. No.: 810,389

[22] PCT Filed: Mar. 28, 1985

[86] PCT No.: PCT/JP85/00150

§ 371 Date: Jan. 8, 1986

§ 102(e) Date: Jan. 8, 1986

[87] PCT Pub. No.: WO85/04372

PCT Pub. Date: Oct. 10, 1985

[30] Foreign Application Priority Data

Mar. 30, 1984 [JP] Japan ............................ 59-62386

[51] Int. Cl.⁴ .......................... G03C 1/78; G03C 1/72
[52] U.S. Cl. ............................ 430/273; 430/271; 430/272; 430/945; 430/21; 430/495; 430/961
[58] Field of Search ............ 430/272, 273, 945, 21, 430/271, 495, 961; 346/125.1, 76 L

[56] References Cited

U.S. PATENT DOCUMENTS 4,300,143  11/1981  Bell et al. ................... 430/945
4,383,311  5/1983   Ettenberg .................... 430/945
4,527,173  7/1985   Gupta et al. ................. 430/272

Primary Examiner—Won H. Louie
Attorney, Agent, or Firm—Oblon, Fisher, Spivak, McClelland & Maier

[57] ABSTRACT

This invention relates to an optical recording medium comprising a recording layer of a dye or dye composition on a substrate and adapted to be written and read using light such as laser or the like. The optical recording medium of the invention is characterized by further comprising a surface layer formed of a coating of a colloidal particle dispersion of a silicon base condensate on the recording layer, with improved S/N ratio as well as improved writing sensitivity and reading output of the optical recording medium.

30 Claims, 2 Drawing Sheets

F I G. 1
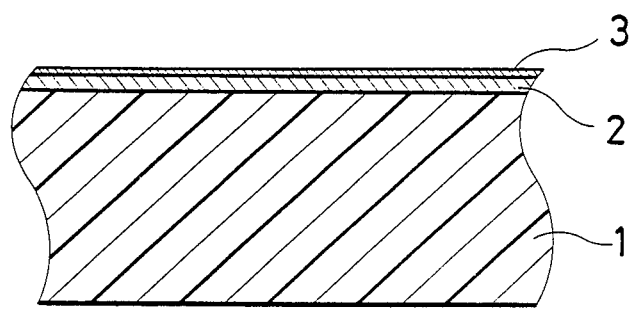
F I G. 2
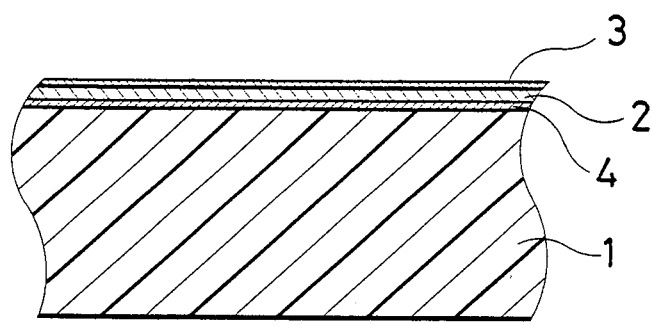

OPTICAL RECORDING MEDIUM

FIELD OF THE INVENTION

The present invention relates to an optical recording medium and, more particularly, to a heat mode optical recording medium.

DESCRIPTION OF THE PRIOR ART

Optical recording media are designed to come into no contact with writing or reading heads and, therefore, are characterized by enjoying perfect freedom from deterioration by wear. This has incited various studies directed to development of optical recording media.

In the optical recording media, those of the heat mode are commanding particular interest of researchers because they have no use for any darkroom treatment for development.

The heat mode optical recording medium is an optical recording medium which utilizes the recording light in the form of heat. For example, the pit-forming type optical recording medium is based on the procedure of writing given information on the medium by forming small holes called pits by removing or melting off a part of the medium with a recording light such as a laser and reading the recorded information by sensing these pits with reading light. In the pit-forming type medium of this operating principle, particularly of the kind using a semiconductor laser permitting miniaturization of device, the recording layer is formed preponderantly of a material composed mainly of Te.

In recent years, increasing proposals and reports have come to cover those media which use recording layers of organic materials composed mainly of dyes in place of Te because Te type materials are harmful, and have to be sensitized to a higher degree and be produced at lower production costs.

Among the organic materials in the recording layers which require the He-Ne laser for the formation of pits, those using squalirium dyes [Japanese Patent Application Laid-open SHO 56(1981)-46,221 and V. B. Jipson and C. R. Jones.: J. Vac. Sci. Technol., 18, (1) 105 (1981)] and those using metal phthalocyanine dyes (Japanese Patent Application Laid-open No. SHO 57(1982)-82,094 and No. SHO 57(1982)-82,095) are included.

Another such organic material which similarly requires the He-Ne Laser uses a metal phthalocyanine dye (Japanese Patent Application Laid-open No. SHO 56(1981)-86,795).

These optical recording media invariably have their recording layers containing respective dyes deposited in the form of film by vacuum deposition and, in this sense, do not differ much from those using Te in terms of the production of recording medium.

Generally, since the laser beam impinging on the vacuum deposited film of dye has a low reflectance, the recording medium using this film fails to obtain an ample S/N ratio in the ordinary method of widespread acceptance which derives read signals from variations (decrease) in the amount of reflected light caused by pits.

When the optical recording medium is produced, which is of the so-called air-sandwich type construction having a recording layer opposed to and joined to a transparent substrate so that writing and reading of information is effected through the substrate, the recording layer can be protected from deterioration without lowering the writing sensitivity and the recording density can be improved. Even this recording and reproducing method is impracticable with the vacuum-deposited film of dye.

This is because, in the ordinary substrate made of transparent resin, the refractance has a certain value (1.5 in the case of polymethyl methacrylate) and the surface reflectance has a fairly large value (4% in the same resin) and the reflectance on the recording layer through the substrate is not more than about 60% in the case of polymethyl methacrylate, for example, and the recording layer which exhibits only a low reflectance, therefore, does not permit reliable detection of variations in the amount of reflected light.

For the purpose of improving the S/N ratio of reading of the recording layer formed of a vacuum deposited film of dye, a vacuum deposited reflecting film such as of Al is generally interposed between the substrate and the recording layer.

In this case, the purpose of the vacuum deposited reflecting film is to increase the reflectance and improve the S/N ratio. By the formation of pits, the reflecting film is exposed to openview to increase the reflectance. Or alternatively, the reflecting film is removed to decrease the reflectance, in some cases. As a matter of course, the recording and reproduction of information cannot be effected by light passed through the substrate.

The recording media in which a recording layer composed of a dye and resin is formed by the spreading technique have also been disclosed such as, for example, the medium using a recording layer formed of IR-132 dye (made by Kodak) and polyvinyl acetate (Japanese Patent Application Laid-open No. SHO 55(1980)-161,690), the medium using a recording layer formed of 1,1'-diethyl-2,2'-tricarbocyanine-iodide and nitrocellulose (Japanese Patent Application Laid-open No. SHO 57(1982)-74,845), and the medium using a recording layer formed of 3,3'-diethyl-12-acetylthiatetra-carbocyanine and polyvinyl acetate (K. Y. Law, et al., Appln. Phys. Lett. 39 (9) 718(1981)).

These optical recording media also require interposition of a reflecting film between the substrate and the recording layer and, therefore, are as defective as those involving use of a vacuum deposited film of dye in respect that recording and reproduction are not obtained by light projected from behind the substrate.

To realize an optical recording medium possessing a recording layer of an organic material which permits recording and reproduction by light passed through the substrate and exhibits interchangeability with a medium including a recording layer of a Te-based material, the organic material itself is required to exhibit a higher reflectance.

In a very small fraction of the optical recording media so far developed, the recording layers of organic materials incorporated therein without interposition of any reflecting layer exhibit a high reflectance.

There have appeared publications purporting that a vacuum deposited film of vanadyl phthalocyanine exhibits a high reflectance [P. Kivits et al., Appl. Phys. Part A 26 (2) 101 (1981), Japanese Patent Application Laid-open No. SHO 55(1980)-97,033]. Despite the high reflectance which is possibly ascribable to the high subliming temperature of the compound, the film is found to possess a poor writing sensitivity.

It has been reported that cyanine dyes and merocyanine dyes of the thiazole type or quinoline type exhibit high writing sensitivity [Yamamoto et al.: Glossary of Manuscripts for the 27th Meeting of Applied Physics, 1p-P-9 (1980)]. An invention based on this publication has been proposed under Japanese Patent Application Laid-open No. SHO 58(1983)-112,790. These dyes are impracticable, however, because the dyes, particularly when they are applied in the form of coating film, exhibit low degrees of solubility in solvents, undergo crystallization readily, show a very poor stability with respect to reading light, and quickly yield to decolorization.

In view of the state described above, the present inventors have already proposed a single-layer film of a cyanine dye of the indolenine type which is highly soluble in solvents, give rise to less crystallization are thermally stable, and shows reflectance (Japanese Patent Application No. SHO 57(1982)-134,397 and No. SHO 57(1982)-134,170).

We have also proposed improvement in solubility and prevention of crystallization in the cyanine dyes of the indolenine type or the thiazole type, quinoline type, selenazole type, etc. by the incorporation of a long-chain alkyl group in the molecules thereof (Japanese Patent Application No. SHO 57(1982)-182,589 and No. SHO 57(1982)-177,776).

We have further proposed addition of transition metal compounds as quenchers to cyanine dye for the enhancement of photostability and particularly the prevention of decolorization by light (degradation by reading) (Japanese Patent Application No. SHO 57(1982)-166,832 and No. SHO 57(1982)-168,048).

As the same token, we have proposed to form ionic combinations (ionically bonded compounds) of dyes with quenchers, thereby reducing degradation by reading and enhancing photostability (Japanese Patent Application No. SHO 59(1984)-14,848, No. SHO 59(1984)-18,878 and No. SHO 59(1984)-19,715).

However, there is still left much to be desired in respect of writing sensitivity.

Turning to the optical recording film comprising a dye or dye composition, pitting takes place simultaneously with light irradiation. Afterwards, the irradiated light is not absorbed at the central portion of that film, on which the largest energy is concentrated. This is responsible for a drop of the efficiency of the energy applied, and is attributable to the fact that sensitivity does not exceed a certain level.

In that case, it is known to provide on the surface of the film a protective film formed of an inorganic compound; however, such a protective film is required to have a thickness of at least 0.2 microns. It is then well-known that there is a drop of sensitivity.

In some cases, such a dye or dye composition is coated on a resinous substrate transparent to writing light and reading light in particular in the form of a recording layer for the particular purpose of effecting writing and reading from the back surface side of the substrate, said substrate being formed of acrylic, polycarbonate or like resins. However, there is a disadvantage that the reflectance of the recording layer is so low that any sufficiently high S/N ratio cannot be obtained.

For extended storage, it is likely that the dye and other additives may dissolve and diffuse into the substrate resin, thus leading to a drop of reflectance.

Moreover, the substrate is damaged or otherwise dented due to heat generated by writing. This also leads to a drop of S/N ratios.

After erasion, there is an increase in noises.

In order to overcome such drawbacks, the present inventors have proposed to use as the underlying layer a hydrolysis coating film of a chelate compound of Ti, Zr, Al, etc. (Japanese Patent Application No. SHO 57(1982)-232,198 and No. SHO 57(1982)-232,199).

However, the conditions imposed upon the preparation and application of the coating liquid for the underlying layers are severe and the coating liquid is poor in storage stability, so that it is not easy to obtain underlying layers of certain quality.

The aforesaid proposal has also the disadvantage that there is a drop of reflectance due to the fact that such a underlying film has a refractive index higher than that of air.

DISCLOSURE OF THE INVENTION

An object of the present invention is to provide an optical recording medium including a recording layer comprising a dye or dye composition on a substrate formed of a resin and a surface layer provided on the recording layer, wherein said surface layer is improved to enhance the writing sensitivity of said optical recording medium. Another object of the present invention is to decrease and increase the refractive index and S/N ratio of such a medium by interposing an underlying layer between the substrate and the recording layer.

Such objects are achieved by the present invention as mentioned below.

More specifically, the present invention provides an optical recording medium comprising a recording layer formed of a dye or dye composition on a substrate formed of a resin, characterized in that the medium further comprises on the recording layer a surface layer formed of a coating of a colloidal particle dispersion of a silicon base condensate.

Preferred embodiments of the present invention are:
(i) The substrate is substantially transparent to writing light and reading light.
(ii) The substrate is formed of a resin.
(iii) The resin is an acrylic resin or polycarbonate resin.
(iv) The surface layer has a thickness of 50 to 300 Å.
(v) The recording layer has a thickness of 400 to 1200 Å.
(vi) The recording layer is formed of a dye composition comprising a dye and a resin.
(vii) The recording layer is formed of a dye composition comprising a dye and a quencher.
(viii) The dye is a cyanine dye or phthalocyanine dye.
(ix) The quencher forms an ionically bonded compound with the dye.
(x) Writing and reading are carried out from the back surface side of the substrate.
(xi) No reflective layer overlies the recording layer.
(xii) The substrate includes thereon an underlying layer, which includes thereon the recording layer.
(xiii) The substrate includes thereon the underlying layer, which includes thereon the recording layer, and is formed of a coating of a colloidal particle dispersion of a silicon base condensate.
(xiv) The underlying layer has a thickness of 50 to 500 Å.

BRIEF DESCRIPTION OF THE DRAWINGS

FIGS. 1 and 2 are partly sectioned views showing embodiments of the optical recording media according to the present invention.

Figure 3:
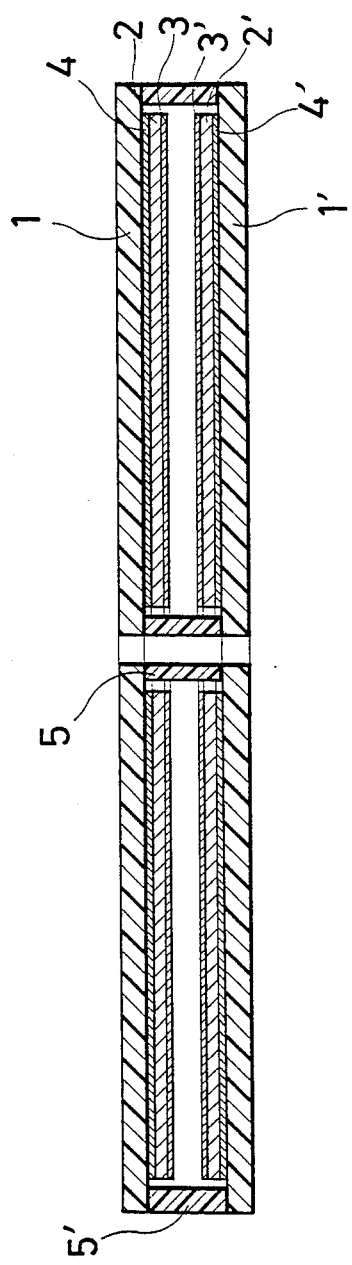
FIG. 3 is a sectional view showing a further embodiment of the optical recording media according to the present invention.

Reference numerals 1, 1' stand for substrates, 2, 2' recording layers, 3, 3' surface layers, and 4, 4' stand for underlying layers.

DETAILED DESCRIPTION OF THE INVENTION

The present invention will now be explained in detail with reference to the concrete construction thereof.

As illustrated in FIGS. 1 to 4, the optical recording medium includes a substrate 1 or 1' having thereon a recording layer 2 or 2'.

The recording layer 2 or 2' of the recording medium according to the present invention contains a dye.

The dyes used, on which no particular limitation is imposed, may include those based on cyanine, phthalocyanine, naphthalocyanine, tetradehydrocholine or tetrahehydrocholol, anthraquinone, azo, triphenylmethane, pyrylium or thiapyrylium salt and the like.

Among such dyes, the cyanine dyes have a noticeable effect on the present invention.

Among the cyanine dyes, preference is given to those expressed in terms of the following formula [I].

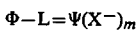

$$\Phi-L=\Psi(X^-)_m$$

wherein symbols $\Psi$ and $\Phi$ each denote a indolenine ring, thiazole ring, oxazole ring, selenazole ring, imidazole ring or pyridine ring, which may have condensed thereto an aromatic ring such as a benzene ring, naphthalene ring or phenanthrene ring.

The rings expressed by symbols $\Phi$ and $\Psi$ may be identical to or different from each other, but are usually identical. These rings may have a variety of substituents bonded thereto. It is to be understood that, in the ring $\Phi$, the nitrogen atoms possess plus charges, while, in the ring $\Psi$, the nitrogen atoms possess minus charges. Preferably, the backbone rings of $\Phi$ and $\Psi$ should be expressed in terms of the following formulae [$\Phi$ I] to [$\Phi$ XVI].

In the following, the structure will be expressed in the form of $\Phi$.

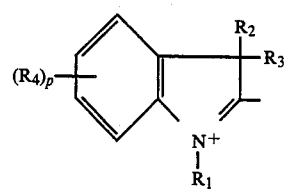

[$\Phi$ I]

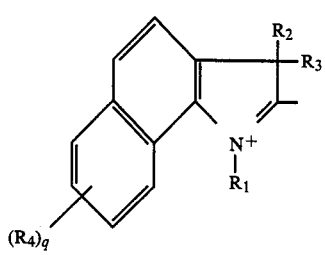

[$\Phi$ II]

-continued

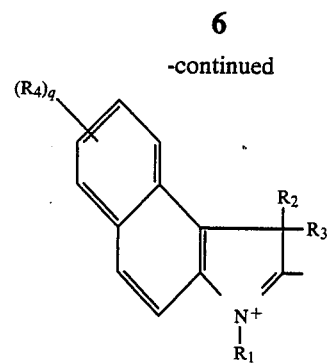

[$\Phi$ III]

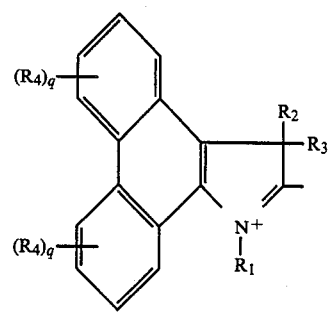

[$\Phi$ IV]

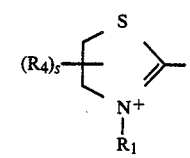

[$\Phi$ V]

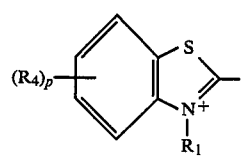

[$\Phi$ VI]

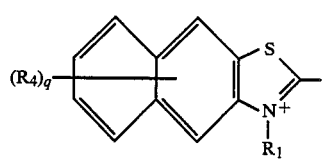

[$\Phi$ VII]

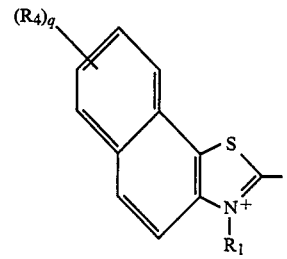

[$\Phi$ VIII]

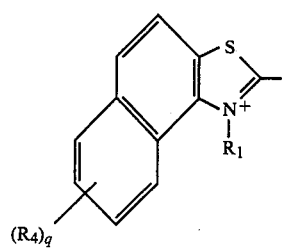

[$\Phi$ IX]

[Φ X]
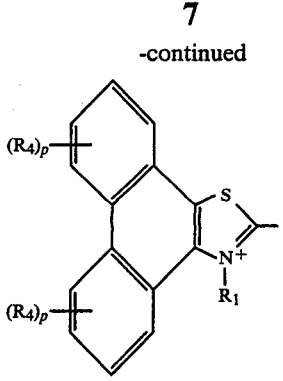

[Φ XI]
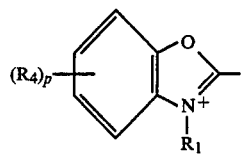

[Φ XII]
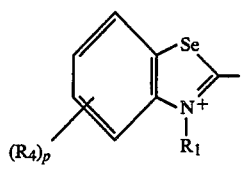

[Φ XIII]
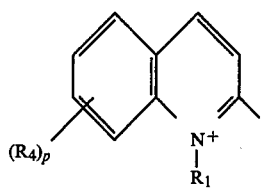

[Φ XIV]
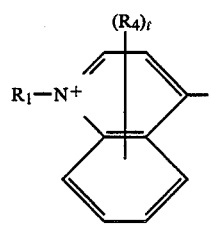

[Φ XV]
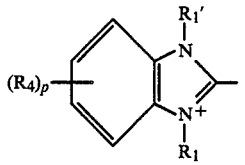

[Φ XVI]
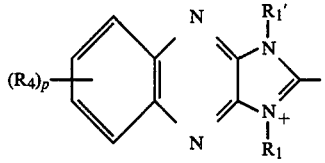

In the various rings enumerated above, the groups $R_1$ ($R_1$ and $R_1'$) bonded to the nitrogen atom (two nitrogen atoms in the imidazole ring) in the ring each denote a substituted or unsubstituted alkyl group or aryl group.

No particular limitation is placed on the number of carbon atoms in the groups $R_1$ and $R_1'$ bonded to the nitrogen atom in such groups. Where these groups further include a substituent, the substituent may be any one member selected from the class consisting of sulfonic group, alkylcarbonyloxy group, alkylamide group, alkylsulfonamide group, alkoxycarbonyl group, alkylamino group, alkylcarbamoyl group, alkylsulfamoyl group, hydroxyl group, carboxy group, halogen atoms and the like.

It is to be understood that, where m to be described later is 0, the group $R_1$ bonded to the nitrogen atom in Φ may be a substituted alkyl or aryl group, and have minus electrical charges.

Where the ring of Φ or Ψ is a condensed or uncondensed indolenine ring (Formulae [Φ I] to [Φ IV]), it is desired to have two substituents $R_2$ and $R_3$ bonded to the 3 position thereof. The two substituents $R_2$ and $R_3$ bonded to the 3 position of the ring are desired to be each an alkyl group or an aryl group. Among the substituents, preference is given to an unsubstituted alkyl group having 1 or 2, preferably 1 carbon atom.

The rings denoted by Φ and Ψ may further have other substitutents $R_4$, bonded to specific positions in the rings. Examples of the substituents so bonded to the rings may include alkyl group, aryl group, heterocyclic residue, halogen atoms, alkoxy group, aryloxy group, alkylthio group, arylthio group, alkylcarbonyl group, arylcarbonyl group, alkyloxycarbonyl group, aryloxycarbonyl group, alkylcarbonyloxy group, arylcarbonyloxy group, alkylamide group, arylamide group, alkylcarbamoyl group, arylcarbamoyl group, alkylamino group, arylamino group, carboxylic group, alkylsulfonyl group, arylsulfonyl group, alkylsulfonamide group, arylsulfonamide group, alkylsulfamoyl group, arylsulfamoyl group, cyano group and nitro group.

Generally, the numbers (p, q, r, s and t) of these substituents are 0 or about 1 to 4. Where p, q, r, s and t denote a number exceeding 2, a plurality of $R_4$'s may be different from one another.

Among others, preference is given to the compounds having condensed or uncondensed indolenine rings of Formulae [Φ I] to [Φ IV] since they excel in solubility, film-forming property, and stability, exhibit extremely high reflectance, and give rise to very high S/N ratios.

The symbol L denotes a connecting group for the formation of mono-, di-, tri- or tetracarbocyanine dyes. It is particularly desired to be any one group selected from the group represented by the formulae [L I] through [L IX].

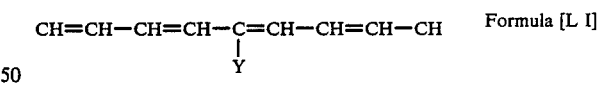
Formula [L I]

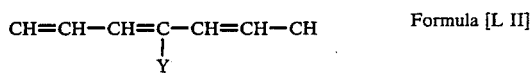
Formula [L II]

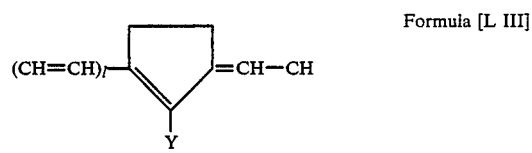
Formula [L III]

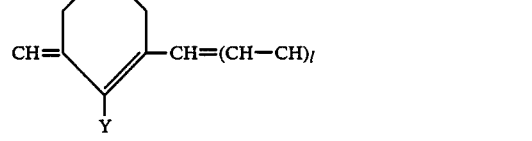
Formula [L IV]

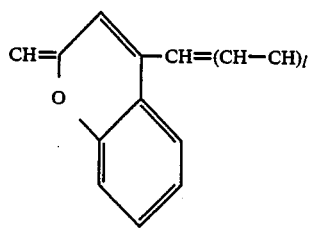

Formula [L V]

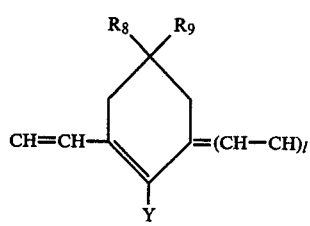

Formula [L VI]

CH=CH—C=CH—CH
       |
       Y

Formula [L VII]

CH—C=CH
    |
    Y

Formula [L VIII]

C
|
Y

Formula [L IX]

In the formulae given above, Y denotes a hydrogen atom or a monovalent group. In this case, the monovalent group should preferably be one member selected from the class consisting of lower alkyl groups such as methyl group, lower alkoxy groups such as methoxy group, di-substituted amino groups such as dimethylamino group, diphenylamino group, methylphenylamino group, morpholino group, imidazolizine group and ethoxy-carbonyl-piperazine group, alkylcarbonyloxy groups such as acetoxy group, alkylthio groups such as methylthio group, cyano group, nitro group and halogen atoms such as Br and Cl.

It is to be noted that, among the connecting rings expressed in terms of Formulae [L I] to [L IX], preference is given to the tricarbocyanine connecting groups such as those expressed in terms of [L II] and [L III] in particular.

Furthermore, a symbol $X^-$ denotes anions, which preferably include $I^-$, $Br^-$, $ClO_4^-$, $BF_4^-$,

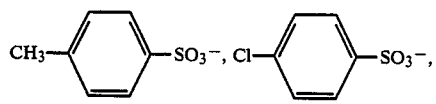

etc.

It is to be noted that m is 0 or 1, but, when m is 0, $R_1$ of $\Phi$ has a minus charge, yielding an inner salt.

In what follows, reference will be made to the concrete examples of the cyanine dyes according to the present invention; it is understood, however, that the invention is not limited thereto.

| Dye No. | $\Phi,\Psi$ | $R_1,R_1'$ | $R_2,R_3$ | $R_4$ | L | Y | l | X |
|---|---|---|---|---|---|---|---|---|
| D1 | [ΦI] | $CH_3$ | $CH_3$ | — | [LII] | H | | I |
| D2 | [ΦI] | $CH_3$ | $CH_3$ | — | [LII] | H | | $ClO_4$ |
| D3 | [ΦI] | $C_2H_4OH$ | $CH_3$ | — | [LIII] | H | 1 | Br |
| D4 | [ΦI] | $(CH_2)_3SO_3^-$ / $(CH_2)_3SO_3^-Na^+$ | $CH_3$ | — | [LII] | H | | — |
| D5 | [ΦII] | $CH_3$ | $CH_3$ | — | [LII] | H | | $ClO_4$ |
| D6 | [ΦIII] | $(CH_2)_3SO_3^-$ / $(CH_2)_3SO_3^-Na^+$ | $CH_3$ | — | [LII] | H | | — |
| D7 | [ΦIII] | $CH_2CH_2OH$ | $CH_3$ | — | [LII] | H | | $ClO_4$ |
| D8 | [ΦIII] | $(CH_2)_2OCOCH_3$ | $CH_3$ | — | [LII] | H | | Br |
| D9 | [ΦIII] | $(CH_2)_2OCOCH_3$ | $CH_3$ | — | [LIII] | $-N(C_6H_5)_2$ | 1 | $ClO_4$ |
| D10 | [ΦIII] | $CH_3$ | $CH_3$ | — | [LII] | H | | $ClO_4$ |
| D11 | [ΦIII] | $CH_3$ | $CH_3$ | — | [LIII] | $-N(C_6H_5)_2$ | 1 | $ClO_4$ |
| D12 | [ΦI] | $C_{18}H_{37}$ | $CH_3$ | — | [LII] | H | | I |
| D13 | [ΦI] | $C_4H_9$ | $CH_3$ | — | [LII] | H | | $ClO_4$ |
| D14 | [ΦI] | $C_8H_{16}OCOCH_3$ | $CH_3$ | — | [LIII] | $-N(C_6H_5)_2$ | 1 | $ClO_4$ |
| D15 | [ΦI] | $C_7H_{14}CH_2OH$ | $CH_3$ | — | [LII] | H | | I |
| D16 | [ΦII] | $C_8H_{17}$ | $CH_3$ | — | [LII] | H | | $ClO_4$ |
| D17 | [ΦIII] | $C_8H_{17}$ | $CH_3$ | — | [LII] | H | | — |
| D18 | [ΦIII] | $C_7H_{14}COO^-$ / $C_7H_{14}COOH$ | $CH_3$ | — | [LIII] | $-N\underset{\phantom{x}}{\diagup\diagdown}N-COOC_2H_5$ | 1 | — |
| D19 | [ΦIII] | $C_7H_{14}COOC_2H_5$ | $CH_3$ | — | [LII] | H | | $BF_4$ |
| D20 | [ΦIII] | $C_4H_9$ | $CH_3$ | — | [LIII] | $-N(C_6H_5)_2$ | 1 | $ClO_4$ |
| D21 | [ΦIII] | $C_{18}H_{37}$ | $CH_3$ | — | [LII] | H | | $ClO_4$ |
| D22 | [ΦIII] | $C_4H_9$ | $CH_3$ | — | [LII] | H | | $ClO_4$ |
| D23 | [ΦI] | $C_{17}H_{34}COOCH_3$ | $CH_3$ | — | [LII] | H | | I |
| D24 | [ΦI] | $C_8H_{16}OCOCH$ | $CH_3$ | — | [LIII] | $-N(C_6H_5)_2$ | 1 | I |
| D25 | [ΦI] | $C_8H_{17}$ | $C_2H_5$ | — | [LII] | H | | I |

-continued

| Dye No. | Φ,Ψ | $R_1,R_1'$ | $R_2,R_3$ | $R_4$ | L | Y | l | X |
|---|---|---|---|---|---|---|---|---|
| D26 | [ΦI] | $C_7H_{15}$ | $C_2H_5$ | — | [LII] | H | | I |
| D27 | [ΦII] | $C_{17}H_{34}COOCH_3$ | $CH_3$ | — | [LII] | H | | $ClO_4$ |
| D28 | [ΦII] | $C_8H_{16}CH_2OCOCH_3$ | $CH_3$ | — | [LIII] | 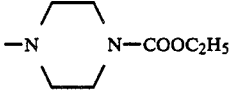 | 1 | I |
| D29 | [ΦII] | $C_{17}H_{35}$ | $CH_3$ | — | [LIV] | 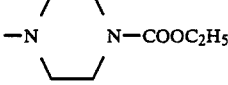 | 1 | $ClO_4$ |
| D30 | [ΦII] | $C_7H_{14}COOCH_3$ | $C_2H_5$ | — | [LII] | H | | $ClO_4$ |
| D31 | [ΦIII] | $C_7H_{14}CH_2OH$ | $CH_3$ | — | [LII] | H | | $ClO_4$ |
| D32 | [ΦIII] | $C_7H_{14}CH_2OCOC_2H_5$ | $CH_3$ | — | [LII] | H | | I |
| D33 | [ΦIII] | $C_{17}H_{34}COOC_2H_5$ | $CH_3$ | — | [LIII] | $-N(C_6H_5)_2$ | 1 | I |
| D34 | [ΦIII] | $C_{17}H_{35}$ | $CH_3$ | — | [LIV] | — | 1 | I |
| D35 | [ΦIII] | $C_7H_{15}$ | $C_2H_5$ | — | [LII] | H | | I |
| D36 | [ΦIV] | $CH_3$ | $CH_3$ | — | [LII] | H | | I |
| D37 | [ΦIV] | $CH_3$ | $CH_3$ | — | [LII] | H | | $ClO_4$ |
| D38 | [ΦIV] | $C_4H_9$ | $CH_3$ | — | [LII] | H | | $ClO_4$ |
| D39 | [ΦIV] | $(CH_2)_2OCOCH_3$ | $CH_3$ | — | [LII] | H | | I |
| D40 | [ΦV] | $C_2H_5$ | — | 4-$CH_3$ | [LII] | H | | I |
| D41 | [ΦV] | $CH_3$ | — | 4-$CH_3$ | [LII] | H | | I |
| D42 | [ΦVI] | $C_2H_5$ | — | — | [LII] | H | | Br |
| D43 | [ΦVI] | $C_2H_5$ | — | 5-Cl | [LIII] | $-N(C_6H_5)_2$ | 1 | Br |
| D44 | [ΦVI] | $C_2H_5$ | — | 5-$OCH_3$ | [LII] | H | | $CH_3C_6H_4SO_3$ |
| D45 | [ΦVI] | $C_2H_5$ | — | 5-$OCH_3$ | [LII] | H | | Br |
| D46 | [ΦVI] | $C_2H_5$ | — | — | [LIV] | — | 1 | Br |
| D47 | [ΦVI] | $C_2H_5$ | — | — | [LII] | H | | Br |
| D48 | [ΦVI] | $C_2H_5$ | — | — | [LI] | H | | Br |
| D49 | [ΦVI] | $C_2H_5$ | — | — | [LII] | $CH_3$ | | Br |
| D50 | [ΦVI] | $C_2H_5$ | — | — | [LV] | H | 1 | Br |
| D51 | [ΦVI] | $C_2H_5$ | — | — | [LV] | H | 1 | Br |
| D52 | [ΦVI] | $C_2H_5$ | — | — | [LVI] | — | 1 | Br |
| D53 | [ΦVII] | $(CH_2)_3OCOCH_3$ | — | — | [LIII] | $-N(C_6H_5)_2$ | 1 | $CH_3C_6H_4SO_3$ |
| D54 | [ΦVI] | $CH_2CH_2OH$ | — | 5-Cl | [LII] | H | | $CH_3C_6H_4SO_3$ |
| D55 | [ΦVIII] | $C_2H_5$ | — | — | [LII] | H | | Br |
| D56 | [ΦIX] | $C_2H_5$ | — | — | [LII] | H | | Br |
| D57 | [ΦIX] | $C_2H_5$ | — | — | [LIII] | 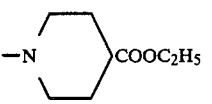 | 1 | $ClO_4$ |
| D58 | [ΦIX] | $C_2H_5$ | — | — | [LIII] | $OCH_3$ | 1 | I |
| D59 | [ΦX] | $C_2H_5$ | — | — | [LII] | H | | I |
| D60 | [ΦXI] | $CH_2CH_2OH$ | — | — | [LII] | H | | Br |
| D61 | [ΦXII] | $C_2H_5$ | — | — | [LII] | H | | I |
| D62 | [ΦXII] | $(CH_2)_3OCOCH_3$ | — | — | [LII] | 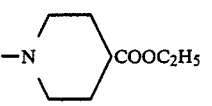 | | $ClO_4$ |
| D63 | [ΦXIII] | $C_2H_5$ | — | — | [LII] | H | | I |
| D64 | [ΦXIII] | $CH_2CH_2CH_2SO_3H$ | — | — | [LIII] | $-N(C_6H_5)_2$ | | $ClO_4$ |
| D65 | [ΦXIII] | $C_2H_5$ | — | — | [LIII] | $-N(C_6H_5)_2$ | 1 | I |
| D66 | [ΦXIV] | $C_2H_5$ | — | — | [LII] | H | | Br |
| D67 | [ΦXV] | $C_2H_5$ | — | — | [LII] | H | | Br |
| D68 | [ΦVI] | $C_8H_{17}$ | — | 4-$CH_3$ | [LII] | H | | I |
| D69 | [ΦVI] | $C_{18}H_{37}$ | — | — | [LIII] | $-N(C_6H_5)_2$ | 1 | Br |
| D70 | [ΦVI] | $C_8H_{17}$ | — | — | [LII] | H | | $ClO_4$ |
| D71 | [ΦVI] | $C_8H_{17}$ | — | 5-Cl | [LIII] | $-N(C_6H_5)_2$ | 1 | $ClO_4$ |
| D72 | [ΦVI] | $C_{18}H_{37}$ | — | 5-Cl | [LII] | H | | I |
| D73 | [ΦVI] | $C_8H_{17}$ | — | 5-$OCH_3$, 6-$OCH_3$ | [LII] | H | | I |
| D74 | [ΦVI] | $C_8H_{17}$ | — | 5-$OCH_3$ | [LIV] | — | 1 | I |
| D75 | [ΦVI] | $C_8H_{37}$ | — | 5-Cl | [LIII] | $-N(C_6H_5)_2$ | 1 | Br |
| D76 | [ΦVI] | $C_{18}H_{37}$ | — | 5-Cl | [LIII] | $-N(C_6H_5)_2$ | 1 | Br |

-continued

| Dye No. | Φ,Ψ | R₁,R₁' | R₂,R₃ | R₄ | L | Y | l | X |
|---|---|---|---|---|---|---|---|---|
| D77 | [ΦVI] | $C_8H_{17}$ | — | — | [LII] | 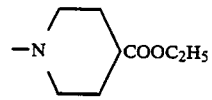 | | I |
| D78 | [ΦVI] | $C_8H_{17}$ | — | — | [LII] | H | | I |
| D79 | [ΦVI] | $C_{18}H_{37}$ | — | 5-Cl | [LII] | H | | $CH_3C_6H_4SO_3$ |
| D80 | [ΦVI] | $C_{18}H_{37}$ | — | 5-Cl | [LII] | H | | $ClC_6H_4SO_3$ |
| D81 | [ΦVI] | $C_8H_{17}$ | — | — | [LV] | H | 1 | I |
| D82 | [ΦVI] | $C_8H_{17}$ | — | — | [LVI] | H | 1 | Br |
| D83 | [ΦVI] | $C_8H_{17}$ | — | — | [LVII] | — | | I |
| D84 | [ΦVII] | $C_8H_{17}$ | — | — | [LIII] | $-N(C_6H_5)_2$ | 1 | Br |
| D85 | [ΦVII] | $C_{18}H_{37}$ | — | — | [LII] | H | | $CH_3C_6H_4SO_3$ |
| D86 | [ΦVII] | $C_{13}H_{27}$ | — | — | [LII] | H | | Br |
| D87 | [ΦVII] | $C_{13}H_{27}$ | — | — | [LII] | H | | Br |
| D88 | [ΦVII] | $C_8H_{17}$ | — | — | [LIII] | 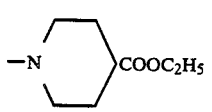 | | $ClO_4$ |
| D89 | [ΦVII] | $C_8H_{17}$ | — | — | [LIII] | $OCH_3$ | | I |
| D90 | [ΦVII] | $C_{18}H_{37}$ | — | — | [LII] | H | | $CH_3C_6H_4SO_3$ |
| D91 | [ΦVII] | $C_8H_{17}$ | — | — | [LII] | H | | $CH_3C_6H_4SO_3$ |
| D92 | [ΦVII] | $C_{18}H_{37}$ | — | — | [LIII] | $-N(C_6H_5)_2$ | 1 | $CH_3C_6H_4SO_3$ |
| D93 | [ΦXI] | $C_8H_{17}$ | — | — | [LII] | H | | Br |
| D94 | [ΦXII] | $C_8H_{17}$ | — | — | [LII] | H | | I |
| D95 | [ΦXII] | $C_8H_{17}$ | — | — | [LIII] | 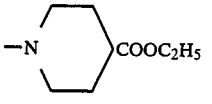 | 1 | $ClO_4$ |
| D96 | [ΦXII] | $C_{13}H_{27}$ | — | 5-Cl | [LII] | H | | I |
| D97 | [ΦXII] | $C_8H_{17}$ | — | — | [LIII] | $-N(C_6H_5)_2$ | 1 | Br |
| D98 | [ΦXII] | $C_{18}H_{37}$ | — | — | [LIII] | $-N(C_6H_5)_2$ | 1 | Br |
| D99 | [ΦXIV] | $C_8H_{17}$ | — | — | [LII] | H | | Br |
| D100 | [ΦXV] | $C_8H_{17}$ | — | — | [LII] | H | | Br |
| D101 | [ΦV] | $C_8H_{17}$ | — | — | [LII] | H | | Br |
| D102 | [ΦVIII] | $C_8H_{17}$ | — | — | [LII] | H | | Br |
| D103 | [ΦXIII] | $C_8H_{17}$ | — | — | [LII] | H | | Br |
| D104 | [ΦI] | $CH_2CH_2OCOCH_3$ | $CH_3$ | — | [LII] | H | | $ClO_4$ |
| D105 | [ΦI] | $CH_2CH_2OH$ | $CH_3$ | — | [LII] | H | | Br |
| D106 | [ΦIII] | $CH_3$ | $CH_3$ | — | [LVI] | Br | 1 | $ClO_4$ |
| D107 | [ΦI] | $CH_3$ | $CH_3$ | — | [LVII] | H | — | $ClO_4$ |
| D108 | [ΦIII] | $CH_3$ | $CH_3$ | — | [LVII] | H | — | $ClO_4$ |
| D109 | [ΦVI] | $C_2H_5$ | — | 6-Cl | [LIII] | $N(C_6H_5)_2$ | 1 | $ClO_4$ |
| D110 | [ΦVI] | $C_8H_{17}$ | — | 6-Cl | [LII] | H | — | $ClO_4$ |
| D111 | [ΦXIV] | $C_2H_5$ | — | — | [LVIII] | H | — | $ClO_4$ |
| D112 | [ΦVI] | $CH_3$ | $CH_3$ | — | [LIII] | $N(C_6H_5)_2$ | — | $ClO_4$ |
| D113 | [ΦVI] | $CH_3$ | $CH_3$ | — | [LII] | H | 0 | $ClO_4$ |
| D114 | [ΦI] | $CH_3$ | $CH_3$, $C_2H_5$ | — | [LII] | H | — | $ClO_4$ |
| D115 | [ΦI] | $CH_3$ | $CH_3$ | 5-Cl | [LII] | H | — | $ClO_4$ |
| D116 | [ΦI] | $CH_3$ | $CH_3$ | 5,6-Cl | [LII] | H | — | $ClO_4$ |
| D117 | [ΦI] | $CH_3$ | $CH_3$ | 5-$OC_2H_5$ | [LII] | H | — | $ClO_4$ |
| D118 | [ΦI] | $CH_3$ | $CH_3$ | 5-$CH_3CONH$ | [LII] | H | — | $ClO_4$ |
| D119 | [ΦI] | $CH_3$ | $CH_3$ | 5,7-Cl | [LII] | H | — | $ClO_4$ |
| D120 | [ΦI] | $CH_3$ | $CH_3$ | 5,7-$C_2H_5OOC$ | [LII] | H | — | $ClO_4$ |
| D121 | [ΦI] | $CH_3$ | $CH_3$ | 5,7-$CH_3O_2S$ | [LII] | H | — | $ClO_4$ |
| D122 | [ΦI] | $CH_3$ | $CH_3$ | 5,7-$CH_3$ | [LII] | H | — | $ClO_4$ |
| D123 | [ΦI] | $CH_3$ | $CH_3$ | 5,7-$CH_3CONH$ | [LII] | H | — | $ClO_4$ |
| D124 | [ΦI] | $CH_3$ | $CH_3$ | 6-$CH_3CONH$ | [LII] | H | — | $ClO_4$ |
| D125 | [ΦI] | $C_2H_5$ | $CH_3$ | 5,7-$CH_3O_2S$ | [LIII] | $N(C_6H_5)_2$ | 1 | $ClO_4$ |
| D126 | [ΦI] | $CH_3$ | $CH_3$ | H | [LIII] | $N(C_6H_5)_2$ | 1 | $ClO_4$ |
| D127 | [ΦI] | $CH_3$ | $CH_3$ | H | [LVI] | Br ($R_8 = R_9 = H$) | 1 | $ClO_4$ |
| D128 | [ΦI] | $CH_3$ | $CH_3$ | H | [LII] | Cl | — | $ClO_4$ |
| D129 | [ΦI] | $CH_3$ | $CH_3$ | 5,7-$CH_3O_2S$ | [LII] | H | — | $ClO_4$ |
| D130 | [ΦI] | $CH_3$ | $CH_3$ | 5-$C_2H_5OOC$ | [LII] | H | — | $ClO_4$ |
| D131 | [ΦI] | $CH_3$ | $CH_3$ | 5-$CH_3$ | [LII] | H | — | $ClO_4$ |

Furthermore, the phthalocyanine dyes also have a significant effect on the present invention.

The phthalocyanine dyes used are not particularly limited, and may include as the central atoms Cu, Fe, Co, Ni, In, Ga, Al, InCl, InBr, InI, GaCl, GaBr, GaI, AlCl, AlBr, Ti, TiO, Si, Ge, H, $H_2$, Pb, Vo, Mn, Sn, etc.

Various substituents such as —OH, halogen, —COOH, NH₂, —COCl, —COOR', —OCOR' (wherein R' denotes various alkyl or aryl groups), —SO₂Cl, —SO₃H, —CONH₂, —CN, —NO₂, —SCN, —SH, —CH₂Cl or the like may be bonded directly, or through a suitable connecting group, to the benzene ring of phthalocyanine.

It is to be noted that the cyanine dyes can easily be synthesized following the methods disclosed in publications such as, for instance, Great Organic Chemistry, Nitrogen-Containing Heterocyclic compounds I, page 432 (Asakura Shoten).

To be specific, a corresponding $\Phi'$—CH₃ (wherein $\Phi'$ denotes a ring corresponding to the aforementioned $\Phi$) is heated in combinatioin with an excess amount of $R_1I$ (wheren $R_1$ denotes an alkyl or aryl group) to introduce $R_1$ into the nitrogen atom in $\Phi'$ to produce $\Phi$—CH₃I⁻.

Then, this product is subjected to dehydrogenation condensation with unsaturated dialdehyde, unsaturated hydroxyaldehyde, pentadienedial or isohorone in the presence of an alkali catalyst such as piperidine, trialkylamine, etc., or acetic anhydride or the like.

Such dyes may form a recording layer alone or in combination with resins.

The resins used may preferably be autoxidizable or thermoplastic resins. The autoxidizable resins to be incorporated into the recording layers decompose oxidatively upon being heated. Among others, particular preference is given to nitrocellulose.

The thermoplastic resins are softened by an increase in the temperature of the dyes absorbing recording light. As the thermoplastic resins use may be made of a variety of known resins.

Among the resins, the particularly usable thermoplastic resins are as follows.

(i) Polyolefins

Polyethylene, polypropylene and poly-4-methylpentene-1.

(ii) Polyolefin copolymers

Ethylene-vinyl acetate copolymer, ethylene-acrylate copolymers, ethylene-acrylic acid copolymer, ethylene-propylene copolymer, ethylene-butene-1 copolymer, ethylene-maleic anhydride copolymer, and ethylene-propylene terpolymer (EPT).

The copolymerizing ratios of comonomers in such copolymers are optional.

(iii) Vinyl chloride copolymers

Vinyl acetate-vinyl chloride copolymer, vinyl chloride-vinylidene chloride copolymer, vinyl chloride-maleic anhydride copolymer, copolymers of acrylic esters or methacrylic esters with vinyl chloride, acrylonitrile-vinyl chloride copolymer, vinyl chloride-vinyl ether copolymer, ethylene- or propylene-vinyl chloride copolymer and ethylenevinyl acetate copolymer having vinyl chloride graft polymerized thereto.

In this case, the polymerizing ratios of comonomers in such copolymers are optional.

(iv) Vinylidene chloride copolymers

Vinylidene chloride-vinyl chloride copolymer, vinylidene chloride-vinyl chloride-acrylonitrile copolymer and vinylidene chloride-butadiene-vinyl halide copolymer.

In this case, the copolymerizing ratios of comonomers in such copolymers are optional.

(v) Polystyrene (vi) Styrene copolymers

Styrene-acrylonitrile copolymer (AS resin), styrene-acrylonitrile-butadiene copolymer (ABS resin), styrene-maleic anhydride copolymer (SMA resin), styrene-acrylic ester-acrylamide copolymers, styrene-butadiene copolymer (SBR), styrene-vinylidene chloride copolymer and styrene-methyl methacrylate copolymer.

In this case, the copolymerizing ratios of comonomers in such copolymers may be optional.

(vii) Styrenic polymers

α-Methylstyrene, p-methylstyrene, 2,5-dichlorostyrene, α,β-vinyl naphthalene, α-vinyl pyridine, acenaphthene and vinyl anthracene, and copolymers thereof such as, for example, copolymer of α-methylstyrene with methacrylic ester.

(viii) Coumarone-indene resin

Coumarone-indene-styrene copolymer.

(ix) Terpene resin or picolite

Terpene resin which is the polymer of limonene derived from α-pinene and picolite derived from β-piene.

(x) Acrylic resin

Particularly acrylic resin of the type containing an atomic group represented by the following formula proves desirable.

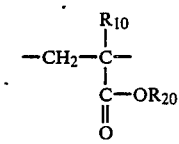

In the formula given above, $R_{10}$ stands for a hydrogen atom or an alkyl group and $R_{20}$ for a substituted or unsubstituted alkyl group. In this case, $R_{10}$ of the foregoing formula is desired to be a hydrogen atom or a lower alkyl group having 1 to 4 carbon atoms. Preferably $R_{10}$ is a hydrogen atom or methyl group. $R_{20}$ may be a substituted or unsubstituted alkyl group and the number of carbon atoms in the alkyl moiety is desired to fall in the range of 1 to 8. When $R_{20}$ is a substituted alkyl group, the substituent thereof is desired to be hydroxyl group, halogen atom or an amino group (particularly a dialkylamino group).

The atomic group represented by the foregoing formula may form a copolymer with other repeating atom group to give rise to a varying acrylic resin. Generally, however, the acrylic resin is formed by obtaining a homopolymer or copolymer using at least one atom group of the aforementioned formula as a repeating unit.

(xi) Polyacrylonitrile (xii) Acrylonitrile copolymers

Acrylonitrile-vinyl acetate copolymer, acrylonitrile-vinyl chloride copolymer, acrylonitrile-styrene copolymer, acrylonitrile-vinylidene chloride copolymer, acrylonitrile-vinyl pyridine copolymer, acrylonitrile-methyl methacrylate copolymer, acrylonitrile-butadiene copolymer and acrylonitrile-butyl acrylate copolymer.

In this case, the copolymerizing ratios of comonomers in these copolymers are optional.

(xiii) Diacetone acrylamide polymers

Diacetone acrylamide polymer obtained by the action of acetone upon acrylonitrile.

(xiv) Polyvinyl acetate (xv) Vinyl acetate copolymers

Copolymers of vinyl acetate with acrylic esters, vinyl ether, ethylene and vinyl chloride.

In this case, the copolymerizing ratios of comonomers in these copolymers are optional.

(xvi) Polyvinyl ethers

Polyvinyl methyl ether, polyvinyl ethyl ether and polyvinyl butyl ether. (xvii) Polyamides Ordinary homonylons such as nylon 6, nylon 6-6, nylon 6-10, nylon 6-12, nylon 9, nylon 11, nylon 12, and nylon 13, polymers such as nylon 6/6-6/6-10, nylon 6/6-6/12, and nylon 6/6-6/11, and optionally modified nylons.

(xviii) Polyesters

Condensates and copolycondensates of various dibasic acids such as aliphatic dibasic acids like oxalic acid, succinic acid, maleic acid, adipic acid and sebatic acid, and aromatic dibasic acids like isophthalic acid and terphthalic acid with various glycols such as ethylene glycol, tetramethylene glycol and hexamethylene glycol.

Among other condensates and copolycondensates, condensates of aliphatic dibasic acids with glycols and copolycondensates of glycols with aliphatic dibasic acids prove particularly advantageous.

Further, modified Glyptal resins obtained by causing Glyptal resin, a condensate of phthalic anhydride with glycerol, to be esterified with a fatty acid and natural resin are advantageously usable.

(xix) Polyvinyl acetal type resins

Polyvinyl formal and polyvinyl acetal type resins obtained by acetalizing polyvinyl alcohols are advantageously usable.

In this case, the acetalizing degrees of polyvinyl acetal type resins are optional.

(xx) Polyurethane resins

Thermoplastic polyurethane resins possessing urethane bond.

Among other polyurethane resins, those obtained by the condensation of glycols with diisocyanates and preferably those obtained by the condensation of alkylene glycols with alkylene diisocyanates prove advantageously usable.

(xxi) Polyethers

Styrene formalin resin, ring-opened polymer of cyclic acetal, polyethylene oxide and glycol, polypropylene oxide and glycol, propylene oxide-ethylene oxide copolymer and polyphenylene oxide.

(xxii) Cellulose derivatives

Nitrocellulose, acetyl cellulose, ethyl cellulose, acetyl-butyl cellulose, hydroxyethel cellulose, hydroxypropyl cellulose, methyl cellulose, ethyl hydroxyethyl cellulose, various esters and ethers of cellulose and mixtures thereof.

(xxiii) Polycarbonates

Various polycarbonates such as polydioxy-diphenyl methane carbonate and dioxy-diphenyl propane carbonate.

(xxiv) Ionomers

Na, Li, Zn and Mg salts of copolymers of methacrylic acid and acrylic acid with ethylene.

(xxv) Ketone resins

Condensates of cyclic ketones such as cyclohexanone and acetophenone with formaldehyde.

(xxvi) Xylene resins

Condensates of m-xylene and mesitylene respectively of formalin and modified products of such condensates.

(xxvii) Petroleum resins $C_5$ type, $C_9$ type and $C_5$–$C_9$ type copolymers, dicyclopentadiene type resins and copolymers thereof, and modified products of such copolymers.

(xxviii) Blends of two or more members selected from the foregoing classes (i) through (xxvii) and blends of such members with other thermoplastic resins.

The molecular weights and other factors of the autoxidizable resins and thermoplastic resins mentioned above may be varied widely.

Such autoxidizable compounds or thermoplastic resins may be usually used to the dye in a wide weight proportion of 1:0.1 to 100.

Preferably, such a recording layer further contains a quencher, thereby decreasing degradation by reading and improving light resistance.

Various quenchers may be used to this end. Particularly preferred is a singlet oxygen quencher which, upon the generation of singlet oxygen by the excitation of the dye, is excited by electron or energy transfer from singlet oxygen for returning to the ground state, and puts singlet oxygen into a triplet state.

Various singlet oxygen quenchers may also be used for that purpose. However, particularly preferred are transition metal chelate compounds, since they serve to reduce or limit acidic degradation, and show good compatibility with respect the dyes used. Preferred central metals in this case are Ni, Co, Cu, Mn, Pd, Pt, etc. Particular preference is then given to the following compounds.

(1) Acetylacetonate chelate base compounds

Q1-1 Ni(II) acetylacetonate
Q1-2 Cu(II) acetylacetonate
Q1-3 Mn(III) acetylacetonate
Q1-4 Co(II) acetylacetonate (2) Bisdithio-α-diketone base compounds expressed in terms of the following formula:

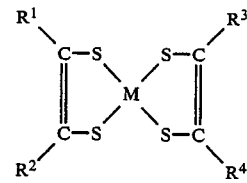

wherein $R^1$ to $R^4$ each denote a substituted or unsubstituted alkyl or aryl group and M denotes a transition metal atom such as Ni, Co, Cu, Pd or Pt.

It is to be understood that M has minus charges, and may form a salt with cations (Cat) such as quaternary ammonium ions.

It is also to be noted that in the following description, ph denotes a phenyl group, φ denotes a 1,4-phenylene group, φ' denotes a 1,2-phenylene group, and "benz" indicates that a condensed benzene ring may be formed by the mutual bonding of two adjacent groups on a ring.

|  | $R^1$ | $R^2$ | $R^3$ | $R^4$ | M | Cat |
|---|---|---|---|---|---|---|
| Q2-1 | ph | ph | ph | ph | Ni | — |
| Q2-2 | $CH_3CO$ | $CH_3CO$ | $CH_3CO$ | $CH_3CO$ | Ni | — |

-continued

| | R¹ | R² | R³ | R⁴ | M | Cat |
|---|---|---|---|---|---|---|
| Q2-3 | φN(C₂H₅)₂ | ph | φN(C₂H₅)₂ | ph | Ni | — |
| Q2-4 | φN(CH₃)₂ | ph | φN(CH₃)₂ | ph | Ni | — |
| Q2-5 | ph | ph | ph | ph | Ni | N⁺(C₄H₉)₄ |

(3) Bisphenyldithiol base compounds expressed in terms of the following formula:

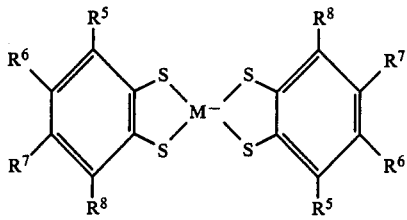

wherein $R^5$ to $R^8$ each denote a hydrogen atom, an alkyl group such as a methyl or ethyl group, a halogen atom such as Cl, or an amino group such as a dimethylamino or diethylamino group and M denotes a transition metal atom such as Ni, Co, Cu, Pd or Pt.

It is to be noted that M in the foregoing structural formula has minus charges, and may form a salt with cations (Cat) such as quaternary ammonium ions, and other ligands may be bonded to the upper and lower positions of M. Concrete examples of the foregoing compounds are as follows.

| | R⁵ | R⁶ | R⁷ | R⁸ | M | Cat |
|---|---|---|---|---|---|---|
| Q3-1 | H | H | H | H | Ni | N⁺(C₂H₅)₄ |
| Q3-2 | H | CH₃ | H | H | Ni | N⁺(n-C₄H₉)₄ |
| Q3-3 | H | Cl | Cl | H | Ni | N⁺(n-C₄H₉)₄ |
| Q3-4 | CH₃ | H | H | CH₃ | Ni | N⁺(CH₃)₃C₁₆H₃₃ |
| Q3-5 | CH₃ | CH₃ | CH₃ | CH₃ | Ni | N⁺(n-C₄H₉)₄ |
| Q3-6 | H | Cl | H | H | Ni | N⁺(n-C₄H₉)₄ |
| Q3-7 | Cl | Cl | Cl | Cl | Ni | N⁺n-C₄H₉)₄ |
| Q3-8 | H | Cl | Cl | Cl | Ni | N⁺(n-C₄H₉)₄ |
| Q3-9 | H | H | H | H | Co | N⁺(n-C₄H₉)₄ |
| Q3-10 | H | CH₃ | CH₃ | H | Co | N⁺(n-C₄H₉)₄ |
| Q3-11 | H | CH₃ | CH₃ | H | Ni | N⁺(n-C₄H₉)₄ |
| Q3-12 | H | CH₃ | CH₃ | H | Ni | N⁺(CH₃)₃C₁₆H₃₃ |
| Q3-13 | Cl | Cl | Cl | Cl | Ni | N⁺(CH₃)₃C₁₆H₃₃ |
| Q3-14 | H | Cl | Cl | Cl | Ni | N⁺(CH₃)₃C₁₆H₃₃ |
| Q3-15 | H | N(CH₃)₂ | H | H | Ni | N⁺(n-C₄H₉)₄ |
| Q3-16 | H | N(CH₃)₂ | N(CH₃)₂ | H | Ni | N⁺(n-C₇H₁₅)₄ |
| Q3-17 | H | N(CH₃)₂ | CH₃ | H | Ni | N⁺(C₈H₁₇)(C₂H₅)₃ |
| Q3-18 | H | N(CH₃)₂ | H | H | Ni | — |
| Q3-19 | H | N(CH₃)₂ | Cl | H | Ni | N⁺(n-C₄H₉)₄ |
| Q3-20 | H | N(CH₃)₂ | H | H | Ni | N⁺(C₆H₆)(CH₃)₃ |

In addition, use may be made of the compounds as disclosed in Japanese Patent Application Laid-open No. SHO 50(1975)-45,027 or Japanese Patent Application No. SHO 58(1983)-163,080.

(4) Ditiocarbamic acid chelate base compounds expressed in terms of the following formula:

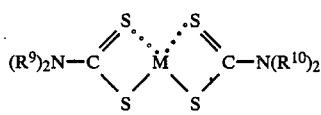

wherein $R^9$ and $R^{10}$ each denote an alkyl group, and M stands for a transition metal atom such as Ni, Co, Cu, Pd or Pt.

| | R⁹, R¹⁰ | M |
|---|---|---|
| Q4-1 | C₄H₉ | Ni |

(5) Compounds expressed in terms of the following formula:

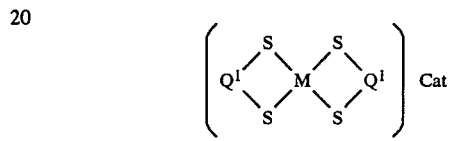

wherein M stands for a transition metal atom, and $Q^1$ denotes $$-C=O(Q^{11}) \quad -C-CN(Q^{12})$$
$$| \quad \quad \text{or} \quad ||$$
$$-C=O \quad \quad -C-CN$$

| | M | Q | Cat |
|---|---|---|---|
| Q5-1 | Ni | Q¹² | 2C₁₆H₃₃N⁺ (CH₃)₃ |
| Q5-2 | Ni | Q¹² | 2C(C₄H₉)₄N⁺ |
| Q5-3 | Co | Q¹² | 2C(C₄H₉)₄N⁺ |
| Q5-4 | Cu | Q¹² | 2C(C₄H₉)₄N⁺ |
| Q5-5 | Pd | Q¹² | 2C(C₄H₉)₄N⁺ |

In addition, use may be made of the compounds as disclosed in Japanese Patent Application No. SHO 58(1983)-125,654.

(6) Compounds expressed in terms of the following formula:

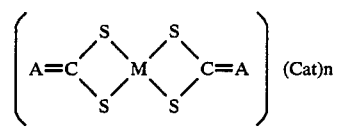

wherein,
M denotes a transition metal atom, $$A \text{ denotes } S, C\begin{matrix}R^{11}\\ \diagdown\\ R^{12}\end{matrix} \text{ or } C Q^2,$$

$R^{11}$ and $R^{12}$ each denote CN, COR¹³, COOR¹⁴, CONR¹⁵, R¹⁶ or SO₂R¹⁷, $R^{13}$ to $R^{17}$ each denote a hydrogen atom, or a substituted or unsubstituted alkyl or aryl gorup, $Q^2$ denotes an atom group required to form a 5 or 6-member ring, "Cat" denotes a cation, n is 1 or 2.

| | M | A | Cat |
|---|---|---|---|
| Q6-1 | Ni | S | $2(n-C_4H_9)_4N$ |
| Q6-2 | Ni | S | $2[n-C_{16}H_{33}(CH_3)_3N]$ |
| Q6-3 | Ni | C(CN)(CN) | 2Na |
| Q6-4 | Ni | $C(CN)_2$ | $2[(n-C_4H_9)_4N]$ |
| Q6-5 | Ni | $C(CN)_2$ | $2[\{n-C_{10}H_{21}O(CH_2)_3\}(CH_3)_3N]$ |
| Q6-6 | Ni | C(CONH2)(CN) | $2[n-C_{16}H_{33}(CH_3)_3N]$ |

The addition, use may be made of the compounds as disclosed in Japanese Patent Application No. SHO 58(1983)-127,074.

(7) Compounds expressed in terms of the following formula:

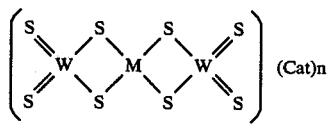

wherein M denotes a transition metal atom, "Cat" stands for cations, and n is 1 or 2.

| | M | Cat |
|---|---|---|
| Q7-1 | Ni | $2[(n-C_4H_9)_3N]$ |
| Q7-2 | Ni | $2[n-C_{16}H_{33}(CH_3)_3N]$ |

In addition, use may be made of the compounds as disclosed in Japanese Patent Application No. SHO 58(1983)-127,075.

(8) Bisphenylthiol base compounds
   Q8-1 Ni-bis (octylphenyl) sulfide (9) Thiocatechol chelate base compounds expressed in terms of the following formula:

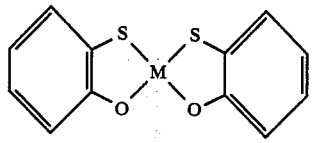

wherein M denotes a transition metal atom such as Ni, Co, Cu, Pd or Pt.

It is to be noted that M has minus charges, and may form a salt with cations (Cat), while each of benzene rings may have a substituent.

| | M | Cat |
|---|---|---|
| Q9-1 | Ni | $N^+(C_4H_9)_4$ |

(10) Compounds expressed in terms of the following formula:

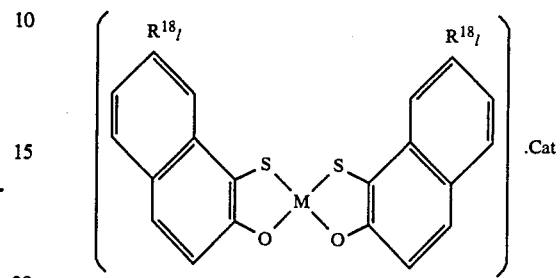

wherein
$R^{18}$ denotes a monovalent group,
l is an integer of 0 to 6,
M denotes a transition metal atom, and
"Cat" denotes a cation.

| | M | R18 | l | Cat |
|---|---|---|---|---|
| Q10-1 | Ni | H | 0 | $N(n-C_4H_9)_4$ |
| Q10-2 | Ni | $CH_3$ | 1 | $N(n-C_4H_9)_4$ |

In addition, use may be made of the compounds as disclosed in Japanese Patent Application No. SHO 58(1983)-143,531.

(11) Compounds expressed in terms of the following two formulae:

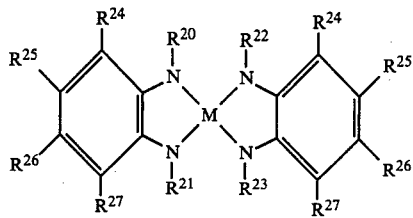

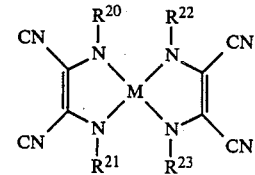

wherein
$R^{20}$, $R^{21}$, $R^{22}$ and $R^{23}$ each denote a hydrogen atom or a monovalent group, and
$R^{24}$, $R^{25}$, $R^{26}$ and $R^{27}$ each denote a hydrogen atom or a monovalent atom,
provided however that $R^{24}$ and $R^{25}$, $R^{25}$ and $R^{26}$, and $R^{26}$ and $R^{27}$ may be bonded to each other to form a 6-member ring, and
M denotes a transition metal atom.

| | Formula | $R^{20}$ | $R^{21}$ | $R^{22}$ | $R^{23}$ | $R^{24}$ | $R^{25}$ | $R^{26}$ | $R^{27}$ | M |
|---|---|---|---|---|---|---|---|---|---|---|
| Q11-1 | [I] | $n-C_4H_9$ | H | $n-C_4H_9$ | H | H | H | H | H | Ni |

-continued

| Formula | | R²⁰ | R²¹ | R²² | R²³ | R²⁴ | R²⁵ | R²⁶ | R²⁷ | M |
|---|---|---|---|---|---|---|---|---|---|---|
| Q11-2 | [I] | C₂H₅COO | C₂H₅COO | C₂H₅COO | C₂H₅COO | H | H | H | H | Ni |

In addition, use may be made of the compounds as disclosed in Japanese Patent Application No. SHO 58(1983)-145,294.

(12) Compounds expressed in terms of the following formula:

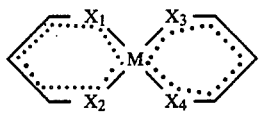

wherein M denotes Pt, Ni or Pd, and $X_1$, $X_2$, $X_3$ and $X_4$ each denote O or S.

| | M | X1 | X2 | X3 | X4 |
|---|---|---|---|---|---|
| Q12-1 | Ni | O | O | O | O |
| Q12-2 | Ni | S | S | S | S |

In addition, use may be made of the compounds as disclosed in Japanese Patent Application No. SHO 58(1983)-145,295.

(13) Compounds expressed in terms of the following formula:

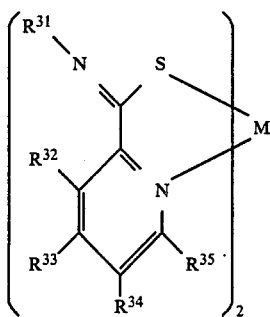

wherein $R^{31}$ stands for a substituted or unsubstituted alkyl or aryl group,
$R^{32}$, $R^{33}$, $R^{34}$ and $R^{35}$ each denote a hydrogen atom or a monovalent group, provided that $R^{32}$ and $R^{33}$, $R^{33}$ and $R^{34}$ and $R^{34}$ and $R^{35}$ may be bonded to each other to form a 6-member ring, and M stands for a transition metal atom.

| | R³¹ | R³² | R³³ | R³⁴ | R³⁵ | M |
|---|---|---|---|---|---|---|
| Q13-1 | nC₄H₉ | H | H | H | H | Ni |
| Q13-2 | C₆H₅ | H | H | C₂H₅ | H | Ni |
| Q13-3 | nC₄H₉ | H | H | benz | | Ni |

In addition, use may be to the compound as disclosed in Japanese Patent Application No. SHO 58(1983)-151,928.

(14) Compounds expressed in terms of the following two formulae:

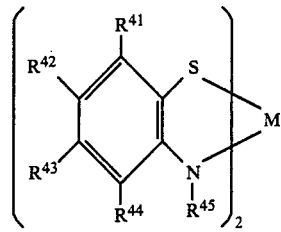

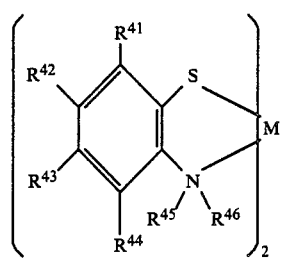

wherein
$R^{41}$, $R^{42}$, $R^{43}$ and $R^{44}$ each denote a hydrogen atom or a monovalent group,
provided that $R^{41}$ and $R^{42}$, $R^{42}$ and $R^{43}$ and $R^{43}$ and $R^{44}$ may be bonded to each other to form a 6-member ring,
$R^{45}$ and $R^{46}$ each denote a hydrogen atom or a monovalent group,
M denotes a transition metal atom.

| | R⁴¹ | R⁴² | R⁴³ | R⁴⁴ | R⁴⁵ | R⁴⁶ | M |
|---|---|---|---|---|---|---|---|
| Q14-1 | H | H | H | H | H | — | Ni |
| Q14-2 | H | H | C₄H₇OCO | H | H | — | Ni |

In addition, use may be made of the compounds as disclosed in Japanese Patent Application No. SHO 58(1983)-151,929.

(15) Compounds expressed in terms of the following formula:

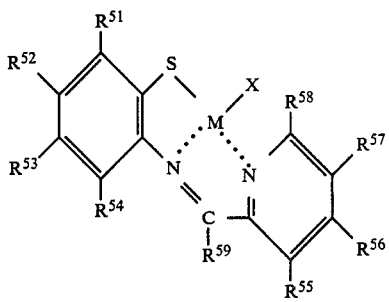

wherein
$R^{51}$, $R^{52}$, $R^{53}$, $R^{54}$, $R^{55}$, $R^{56}$, $R^{57}$ and $R^{58}$ each denote a hydrogen atom or a monovalent group, provided that $R^{51}$ and $R^{52}$, $R^{52}$ and $R^{53}$, $R^{53}$ and $R^{54}$, $R^{54}$ and $R^{55}$, $R^{55}$ and $R^{56}$, $R^{56}$ and $R^{57}$, $R^{57}$ and $R^{58}$ may be bonded to each other to form a 6-member ring, X denotes a halogen atom,
M denotes a transition metal atom.

|  | $R^{51}$ | $R^{52}$ | $R^{53}$ | $R^{54}$ | $R^{55}$ | $R^{56}$ | $R^{57}$ | $R^{58}$ | $R^{59}$ | X | M |
|---|---|---|---|---|---|---|---|---|---|---|---|
| Q15-1 | H | nC$_4$H$_9$ | H | H | H | H | H | H | H | Cl | Ni |
| Q15-2 | H | H | nC$_4$H$_9$OCO | H | H | H | H | H | H | Cl | Ni |

In addition, use may be made of the compounded as disclosed in Japanese Patent Application No. SHO 58(1983)-153,392.

(16) Salycylaldehydeoxime base compounds expressed by the following formula:

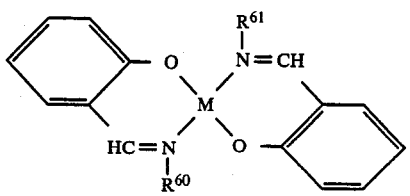

wherein $R^{60}$ and $R^{61}$ each denote an alkyl group, and M stands for a transition metal atom such as Ni, Co, Cu, Pd or Pt.

|  | $R^{60}$ | $R^{61}$ | M |
|---|---|---|---|
| Q16-1 | i-C$_3$H$_7$ | i-C$_3$H$_7$ | Ni |
| Q16-2 | (CH$_2$)$_{11}$CH$_3$ | (CH$_2$)$_{11}$CH$_3$ | Ni |
| Q16-3 | (CH$_2$)$_{11}$CH$_3$ | (CH$_2$)$_{11}$CH$_3$ | Co |
| Q16-4 | (CH$_2$)$_{11}$CH$_3$ | (CH$_2$)$_{11}$CH$_3$ | Co |
| Q16-5 | C$_6$H$_5$ | C$_6$H$_5$ | Ni |
| Q16-6 | C$_6$H$_5$ | C$_6$H$_5$ | Co |
| Q16-7 | C$_6$H$_5$ | C$_6$H$_5$ | Cu |
| Q16-8 | NHC$_6$H$_5$ | NHC$_6$H$_5$ | Ni |
| Q16-9 | OH | OH | Ni |

(17) Thiobisphenolate chelate base compounds having the following formula:

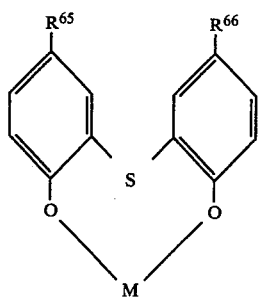

wherein M has the same meanings as mentioned above, and $R^{65}$ and $R^{66}$ each denote an alkyl group. It is to be noted that M has minus charges, and may form a salt with cations (Cat).

|  | $R^{65}$, $R^{66}$ | M | Cat |
|---|---|---|---|
| Q17-1 | t-C$_8$H$_{17}$ | Ni | N$^+$H$_3$(C$_4$H$_9$) |
| Q17-2 | t-C$_8$H$_{17}$ | Co | N$^+$H$_3$(C$_4$H$_9$) |
| Q17-3 | t-C$_8$H$_{17}$ | Ni | — |

(18) Phosphonous acid chelate base compounds having the following formula:

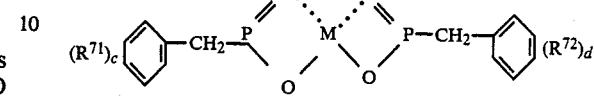

wherein M has the same meanings as mentioned above, and $R^{71}$ and $R^{72}$ each denote a substituent such as an alkyl or hydroxyl group.

|  | $R^{71}$, $R^{72}$ | M |
|---|---|---|
| Q18-1 | 3-t-C$_4$H$_9$, 5-t-C$_4$H$_9$, 6-OH | Ni |

(19) Compounds having the following formulae:

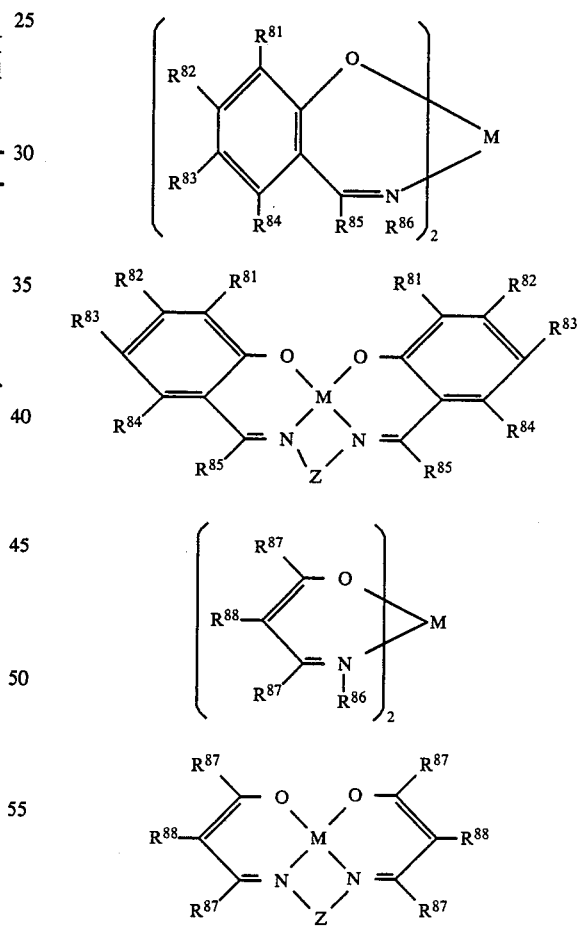

wherein
$R^{81}$, $R^{82}$, $R^{83}$ and $R^{84}$ each denote a hydrogen atom or a monovalent group,
provided that $R^{81}$ and $R^{82}$, $R^{82}$ and $R^{83}$ and $R^{83}$ and $R^{84}$ may be bonded to each other to form a 6-member ring,
$R^{85}$ and $R^{88}$ each denote a hydrogen atom or a substituted or unsubstituted alkyl or aryl group, $R^{86}$ denotes a hydrogen atom, a hydroxyl group or a substituted or unsubstituted alkyl or aryl group, $R^{87}$ denotes a substituted or unsubstituted alkyl or aryl group, Z denotes a nonmetal atom group required to form a 5- or 6-member ring, M denotes a transition metal atom.

|  | $R^{81}$ | $R^{82}$ | $R^{83}$ | $R^{84}$ | $R^{85}$ | $R^{86}$ | Z | M |
|---|---|---|---|---|---|---|---|---|
| Q19-1 | H | OH | H | H | $nC_5H_{11}$ | H | — | Ni |
| Q19-2 | H | OH | $tC_4H_9$ | H | $nC_9H_{19}$ | H | — | Ni |
| Q19-2 | $tC_4H_9$ | OH | H | OH | $CH_3$ | OH | — | Ni |

In addition, use may be made of the compounds as disclosed in Japanese Patent Application No. SHO 58(1983)-153,393.

(20) Compounds having the following formula:

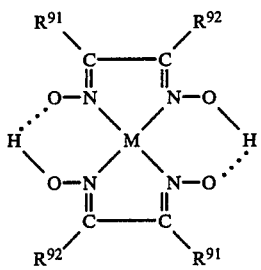

wherein $R^{91}$ and $R^{92}$ each denote a hydrogen atom, or a substituted or unsubstituted alkyl, aryl, acyl, N-alkylcarbamoyl, N-arylcarbamoyl, N-alkylsulfamoyl, N-arylsulfamoyl, alkoxycarbonyl or aryloxycarbonyl group, and M denotes a transition metal atom.

|  | $R^{91}$ | $R^{92}$ | M |
|---|---|---|---|
| Q20-1 | $nC_4H_9$ | $CH_3$ | Ni |
| Q20-2 | $CH_3$ | $CH_3O$—$\phi$-NHCO | Ni |

In addition, use may be made of the compounds as disclosed in Japanese Patent Application No. SHO 58(1983)-155,359.

Other quenchers used may include the following compounds.

(21) Benzoate base compounds

Q21-1 Existing chemical substance 3-3040 [CHINUBIN-120 (manufactured by Chiba Geigy Co., Ltd.)]

(22) Hindered amine base compounds

Q22-1 Existing chemical substance 5-3732 [SANOLIS-770 (manufactured by Sankyo Seiyaku Co., Ltd.)]

Each quencher may be contained in an amount of 0.01 to 12 moles, particularly about 0.05 to 1.2 moles per mole of dye.

It is to be understood that the maximum absorption wavelength of each quencher should preferaby be equal to or larger than that of the dye used.

This results in a considerable reduction in the degradation by reading.

It is preferred in this case that a difference in the maximum absorption wavelength between both components is 0 or up to 350 nm.

For diminishing sizes of the device, it is preferred that semi-conductor lasers of 750, 780 and 830 nm, a He-Ne laser of 633 nm and the like are used as the writing and reading light sources. It is thus desired that the maximum absorption wavelength of the singlet oxygen quenchers be in a range of at least 680 nm, particularly 680–1500 nm, more particularly 800–1500 nm.

It is further preferred that $\epsilon_D/\epsilon_q$ is at least 3, wherein $\epsilon_D$ an $\epsilon_Q$ are respectively the coefficients of absorption of the dye and singlet oxygen quencher used at the wavelength of reading light, provided however that, when two or more dyes are used, $\epsilon_D$ represents the effective value thereof.

It is to be noted that, when one dye is used in combination with other dye or dyes, the maximum absorption wavelength and $\epsilon_D$ are the arithmetically averaged effective values corresponding to the concentration.

Such a value assures that the exitation of the quencher and, hence, the degradation by reading due to singlet oxygen are limited to a very small degree.

Moreover, the quencher may form an ionic combination or ionically bonded compound with the dye.

As the quencher-dye ionic combinations, use may be made of those disclosed in Japanese Patent Application No. SHO 59(1984)-14,848.

It is noted that more preferred are the combinations of cyanine dye cations with quencher anions as disclosed in Japanese Patent Application No. SHO 59(1984)-18,878 and No. SHO 59(1984)-19,715.

The cyanine dye cations used may be any one of those as mentioned in the foregoing.

The quencher anions used may be any one of those mentioned in (3), (5), (6), (7), (9), (10) and (17).

In the following, concrete examples of the ionic combinations will be given, wherein $D^+$ is the cation of the corresponding D, and $Q^-$ is the anion of the corresponding quencher.

|  | $D^+$ | $Q^-$ |
|---|---|---|
| SD1 | $D^{+1}$ | $Q^{-3-8}$ |
| SD2 | $D^{+1}$ | $Q^{-3-15}$ |
| SD3 | $D^{+1}$ | $Q^{-3-15}$ |
| SD4 | $D^{+10}$ | $Q^{-3-3}$ |
| SD5 | $D^{+10}$ | $Q^{-3-15}$ |
| SD6 | $D^{+17}$ | $Q^{-3-8}$ |
| SD7 | $D^{+21}$ | $Q^{-3-8}$ |
| SD8 | $D^{+11}$ | $Q^{-3-8}$ |
| SD9 | $D^{+8}$ | $Q^{-3-8}$ |
| SD10 | $D^{+8}$ | $Q^{-3-2}$ |
| SD11 | $D^{+9}$ | $Q^{-3-15}$ |
| SD12 | $D^{+106}$ | $Q^{-3-15}$ |
| SD13 | $D^{+10}$ | $Q^{-3-15}$ |
| SD14 | $D^{+5}$ | $Q^{-3-15}$ |
| SD15 | $D^{+10}$ | $Q^{-3-7}$ |
| SD16 | $D^{+22}$ | $Q^{-3-15}$ |
| SD17 | $D^{+105}$ | $Q^{-3-16}$ |
| SD18 | $D^{+7}$ | $Q^{-3-17}$ |
| SD19 | $D^{+20}$ | $Q^{-3-19}$ |
| SD20 | $D^{+1}$ | $Q^{-3-1}$ |
| SD21 | $D^{+1}$ | $Q^{-3-2}$ |
| SD22 | $D^{+1}$ | $Q^{-3-16}$ |
| SD23 | $D^{+1}$ | $Q^{-3-17}$ |
| SD24 | $D^{+10}$ | $Q^{-3-7}$ |
| SD25 | $D^{+106}$ | $Q^{-3-8}$ |
| SD26 | $D^{+106}$ | $Q^{-3-7}$ |
| SD27 | $D^{+106}$ | $Q^{-3-2}$ |
| SD28 | $D^{+106}$ | $Q^{-3-16}$ |
| SD29 | $D^{+5}$ | $Q^{-3-8}$ |
| SD30 | $D^{+5}$ | $Q^{-3-2}$ |
| SD31 | $D^{+5}$ | $Q^{-3-7}$ |
| SD32 | $D^{+5}$ | $Q^{-3-16}$ |
| SD33 | $D^{+1}$ | $Q^{-3-8}$ |
| SD34 | $D^{+1}$ | $Q^{-3-3}$ |
| SD35 | $D^{+10}$ | $Q^{-3-1}$ |
| SD36 | $D^{+17}$ | $Q^{-17-1}$ |
| SD37 | $D^{+11}$ | $Q^{-10-1}$ |
| SD38 | $D^{+21}$ | $Q^{-7-2}$ |

-continued

| | D+ | Q− |
|---|---|---|
| SD39 | D+9 | Q−10-1 |
| SD40 | D+106 | Q−6-1 |
| SD41 | D+5 | Q−3-3 |
| SD42 | D+42 | Q−3-8 |
| SD43 | D+109 | Q−3-8 |
| SD44 | D+70 | Q−3-8 |
| SD45 | D+110 | Q−3-8 |
| SD46 | D+70 | Q−3-15 |
| SD47 | D+42 | Q−3-17 |
| SD48 | D+43 | Q−3-7 |
| SD49 | D+81 | Q−3-8 |
| SD50 | D+111 | Q−3-8 |
| SD51 | D+112 | Q−3-2 |
| SD52 | D+113 | Q−3-8 |
| SD53 | D+70 | Q−2-3 |
| SD54 | D+125 | Q−3-12 |
| SD55 | D+115 | Q−3-8 |
| SD56 | D+113 | Q−3-8 |
| SD57 | D+115 | Q−3-12 |
| SD58 | D+115 | Q−3-3 |
| SD59 | D+115 | Q−3-7 |
| SD60 | D+131 | Q−3-8 |
| SD61 | D+131 | Q−3-12 |
| SD62 | D+129 | Q−3-8 |
| SD63 | D+129 | Q−3-12 |
| SD64 | D+130 | Q−3-8 |
| SD65 | D+127 | Q−3-8 |
| SD66 | D+127 | Q−3-12 |
| SD67 | D+128 | Q−3-12 |
| SD68 | D+128 | Q−3-8 |

The recording layers 2 and 2' may generally be provided on the substrste 1 and 1' in the ordinary manner.

Usually, each recording layer may have a thickness of about 0.03 to 2 microns. Recording layers may be formed only with the dye and quencher by suitable means such as vacuum deposition or sputtering.

Preferably, each recording layer has a thickness of 0.04 to 0.12 microns, particularly 0.05 to 0.08 microns.

In a thickness of up to 0.04 microns, particularly 0.03 microns, so small are both absorption and reflectance that it is impossible to increase both writing and recording sensitivity.

Figure 4:
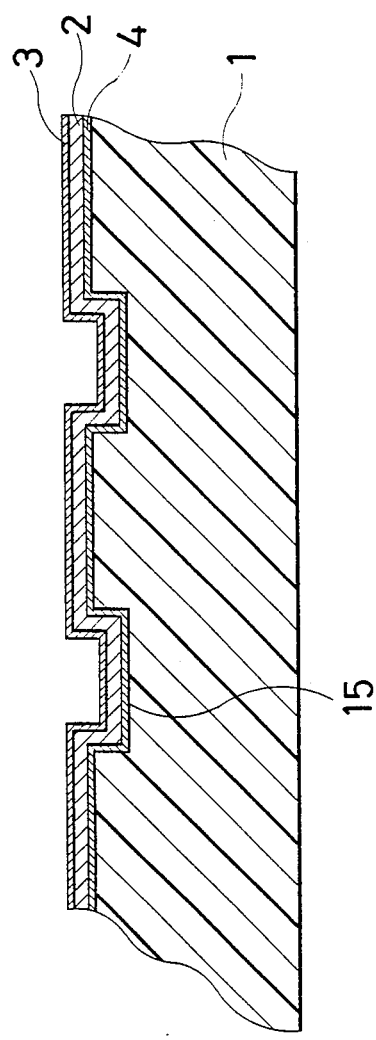
FIG. 4 is a partly sectioned view showing a still further embodiment of the optical recording media according to the present invention.

In a thickness exceeding 0.12 microns, difficulty is involved in obtaining any tracking signal, since burying of a pregroove 15, as shown in FIG. 4, takes place. It is also not easy to form pits, and there is a drop of reading sensitivity.

Such recording layers may further contain other dyes, other polymers or oligomers, various plasticizers, surfactants, antistatics, lubricants, fire retardants, stabilizers, dispersants, antioxidants, crosslinkers and other agents.

For the provision of such recording layers, the starting materials may be coated on the substrate with a suitable solvent, followed by drying.

It is to be noted that the solvents used for coating include ketones such as methyl ethyl ketone, methyl isobutyl ketone and cyclohexanone, esters such as butyl acetate, ethyl acetate, carbitol acetate and butylcarbitol acetate, ethers such as methyl cellosolve and ethyl cellosolve, aromatic solvent such as toluene and xylene, halogenated alkyl solvent such as dichloroethane and alcohols.

The substrates 1 and 1' on which the recording layers 2 and 2' are to be formed may be formed of a material substantially transparent to writing and reading light (having a transmission of, preferably, at least 80%). For instance, those substrates may be formed of either resins or glasses.

Depending upon the purpose, the substrates may be in the form of tapes, drums, belts or the like.

It is to be noted that the substrates are preferably formed of a resin in view of handling and other factors. To this end various resins may be used, including e.g., polymethyl methacrylate, acrylic resin, epoxy resin, polycarbonate resin, polysulfon resin, polyether sulfon or methyl pentene polymer.

Among such resins, the acrylic or polycarbonate resins are preferred, since they are so easily attacked by various coating solvents, in particular, ketones, esters or halogenated alkyl solvents, that the effect of the underlying layer according to the present invention becomes especially noticeable.

Since they are substantially transparent to writing and reading light, writing and reading can be carried out from the back surface side of the substrate. This is advantageous in view of sensitivity, S/N ratios, etc., and in view of actual considerations such as dust prevention. Due to their good moldability, it is also easy to form a groove for tracking.

Preferred acrylic resins are copolymers or homopolymers composed mainly of methacrylates including a linear or cyclic alkyl group having 1-8 carbon atoms such as, for instance, polymethyl methacrylate.

Preferred polycarbonate resins are of the bisphenol A type.

The effect of the underlying layer according to the present invention becomes more noticeable, especially when the acrylic or polycarbonate resins are formed by injection molding.

It is to be understood that the acrylic or polycarbonate resins have preferably a number-average polymerization degree of about 800 to 6000.

As illustrated in FIG. 4, a pregroove 15 for tracking is preferably formed in the recording layer 2 or 2' on the substrate 1 and 1'.

The pregroove 15 then has a depth of about $\lambda/8n$, particularly $\lambda/7n$ to $\lambda/12n$ (wherein n is the refractive index of the substrate). The pregroove 15 has a width nearly equal to a tracking width.

It is then preferred that writing and reading light is irradiated from the back surface side of the substrate, while using as the tracking portion the recording layer 2 or 2' positioned within the pregroove 15.

With such an arrangement it is possible to introduce improvements into writing sensitivity and reading S/N ratios and increase a control signal for tracking.

In the present invention, a surface layer 3 is additionally provided on the recording layer 2 on the substrate 1, as shown in FIG. 1.

The surface layer 3 is formed of a coating of a colloidal particle dispersion of the silicon base condensate.

Preferably, the colloidal particles of silicon base condensates consist of hydrolysis condensates of halogenated silicon, esp., silicon tetrachloride, or alkyl silicates, esp., tetra-lower alkyl (ethyl, methyl) silicates.

The colloidal particles then have a particle size of 30 to 100 Å, in particular about 50 to 80 Å.

As the dispersion solvents use may be made of an alcohol, partcularly a monovalent aliphatic alcohol, or an alkyl acetate, or a mixed solvent thereof with an aromatic hydrocarbon.

For hydrolysis, a mineral acid may be added. if required.

If required, a stabilizer or surfactant such as ethylene glycol and the like may further be added.

Referring to one example of such colloidal particle dispersions, Japanese Patent Publication No. SHO (31)-6533 teaches that silicon tetrachloride ($SiCl_4$) and a monovalent aliphatic alcohol is dissolved in an alkyl acetate. The coating film consisting of such a coating film is applied on the recording layer.

Use may be made of products obtained by adding 1 to 20 wt% ethylene glycol to a solution comprising a tetraalkyl silicate and a monovalent aliphatic alcohol, an alkyl acetate and a mineral acid, as disclosed in Japanese Patent Publication No. SHO 36(1961)-4740.

Use may be further made of an alcoholic solution of a tetra-lower alkyl silicate as disclosed in Japanese Patent Publication No. SHO 45(1970)-35,435.

The monovalent aliphatic alcohols used may include methyl alcohol, ethyl alcohol, a modified alcohol, isopropyl alcohol, butyl alcohol or mixtures thereof.

The alkyl acetates used may include methyl acetate, ethyl acetate, amyl acetate, butyl acetate or mixtures thereof.

The mineral acids used may include aqueous solutions of hydrochloric acid and sulfuric acid, which are usually used in industrial fields.

It is to be understood that the dispersion may be applied by means of e.g., spinner coating in the conventional manner.

Subsequently, drying may be carried out at 40°–80° C. for about 20 minutes to 2 hours.

The film coated in this manner is a silicon oxide film which may partly contain a hydroxide.

Each of the surface layers 3 and 3' has a thickness of 0.005 to 0.03 microns, more preferably 0.008 to 0.012 microns.

A surface layer having a thickness of less than 0.005 microns does not give rise to any optical recording medium which has improved writing and reading sensitivity. When the surface layer has a thickness exceeding 0.03 microns, on the contrary, the writing and reading sensitivity of the resulting optical recording medium drops.

Turning to the optical recording film comprising a dye or dye composition, pits are formed thereon simultaneously with light irradiation. Afterwards, the irradiated light is not absorbed at the central portion of that film, on which the greatest energy is concentrated. This is responsible for a drop of the efficiency of the energy applied, and is attributable to the fact that sensitivity does not exceed a certain level.

According to the present invention, pitting is inhibited for a certain time of light irradiation by the provision of a high-melting hard film on the surface, and optionally, underlayer of the recording film, especially on the surface thereof, with a view to effecting the formation of pits immediately upon a sufficient temperature being reached.

Preferably, the recording layer 2 having the surface layer 3 according to the present invention includes an underlying layer 4 facing the substrate.

The underlying layer 4 may be formed of a variety of known materials.

Thus, that layer 4 may be a vapor-deposited film based on inorganic materials such as various oxides, nitrides or carbides, for instance, silicon oxide, titanium oxide, aluminium oxide, magnesium oxide, zirconium oxide, silicon nitride, silicon carbide, etc.

Preferable are also hydrolysis coating films composed mainly of oxides, e.g., silicon oxide, titanium oxide, zirconium oxide, aluminium oxide, etc., which are formed by the application, heating and drying of chelate compounds known as the so-called crosslinkers, etc., such as, for example, organic compounds or organic polyfunctional compounds of Si, Ti, Al, Zr, In, Ni, Ta, etc.

It is to be appreciated that the most effective is a coating film of a colloidal particle dispersion of the aforesaid silicon base condensate.

It is preferred that the underlying layer is formed in the same manner as the aforesaid surface layer.

The underlying layer has a thickness of 0.005 to 0.05 microns, more preferably 0.008 to 0.03 microns.

In a thickness of less than 0.005 microns, the underlying layer produces only insufficient solvent resistance- and heat resistance-affording effect to the substrate. In a thickness exceeding 0.05 microns, there is a drop of sensitivity.

By the provision of the underlying layer as mentioned in the foregoing, it is possible to increase the sensitivity and S/N ratio of the optical recording media.

Usually, the underlying layer is directly provided thereon with the recording layer. If required or in some cases, however, an intermediate layer may additionally be provided between the underlying layer and the recording layer.

Similarly, the surface layer may additionally be provided thereon with a variety of the outermost protective layers, a half-mirror, etc.

The medium of the present invention may include the aforesaid recording and surface layers on one side of the substrate through the underlying layer, if required. Alternatively, that medium may include the aforesaid recording and surface layers on both sides of the substrate through the underlying layers, if required.

As illustrated in FIG. 3, two media including on the substrates 1 and 1' the recording and surface layers 2, 2' and 3, 3' through the underlying layers 4 and 4', if required, are arranged with the recording layers 2 and 2' facing each other at a given interval, and are closed up with the use of spacers 5 and 5' for dust- and flaw-proofness.

It is to be noted that, preferably, no reflective layer overlies the recording layer.

The medium of the present invention is irradiated with recording light in a pulsed manner, while it runs or turns.

At this time, the dye contained in the recording layer generates heat to decompose the autoxidizable resin or melt the thermophastic resin and dye for pitting.

It is then preferred that writing is carried out from the back surface side of the substrate.

Especially when the tri- or tetra-carbocyanine dye is used, very satisfactory results can be obtained, if writing is carried out with a semiconductor laser, etc.

When the phthalocyanine dye is used, very satisfactory results can also be attained, if writing is effected with a semiconductor laser, etc.

While the medium still runs or turns, the pits formed in this manner are read out by the detection of the reflected or transmitted light of the reading light having the aforesaid wavelength, in particular the reflected light.

It is then preferred that the substrate is irradiated with reading light from the back surface side thereof for the detection of the reflected light.

It is to be appreciated that, when the thermoplastic resin is used for the recording layer, the pits previously formed in the recording layer may be erased by light or heat for re-writing.

It is also to be appreciated that a He-Ne laser, etc. may be used for recording or reading light.

It is further preferred that, at the time of writing or reading, tracking is done making use of the interference effect due to the aforesaid pregroove.

INDUSTRIAL USABILITY

According to the present invention, improvements are introduced into the writing sensitivity and reproduction output of the optical recording medium, since it includes on the recording layer comprising a dye or dye composition the surface layer formed of a coating film of a colloidal particle dispersion of the silicon base condensate.

By interposing the underlying layer between the substrate and the recording layer, if required, it is possible to further improve the S/N ratio with the resulting further improvements in the writing sensitivity and reading S/N ratio.

Besides, the incorporation of the underlying layer introduces improvements into the solvent resistance, heat resistance and recording resistance of the optical recording media.

Thus, the optical recording media of the present invention are best-suited for use in the form of various disks, tapes, drums, cards such as document files, data files, CD and CD-ROM-corresponding DRAW ID cards, video disks, stationary picture files, etc.

BEST MODE FOR CARRYING OUT THE INVENTION

In what follows, the present invention will be explained in further detail with reference to the examples and comparison examples.

EXAMPLE 1

As the substrate use was made of an extruded substrate of polymethyl methacrylate (PMMA), 30 cm in diameter and 1.5 mm in thickness (Substrate A).

A coating liquid comprising an 1% dye solution of Dye D-2 and Quencher Q3-7 (5:2)-dichloroethane, dichlorohexanone (6:5)-was applied on Substrate A by means of spinner coating to prepare a recording layer found to have a film thickness of 0.06 microns.

Then the following ingredients:

| Tetraethylhydrochloric acid | 4.2 parts |
| Ethyl alcohol | 43 parts |
| Ethyl acetate | 42 parts |
| Concentrated hydrochloride acid | 5.4 parts |
| Ethylene glycol | 5.4 parts | were mixed together to prepare a colloidal dispersion of 50 to 80 Å, which was in turn diluted with n-propanol into a coating liquid.

That liquid was spinner-coated on the recording layer, which was treated at 60° C. for 30 minutes. The resulting surface layer was found to have a thickness of 0.01 micron.

COMPARISON EXAMPLE 1

The same substrate (Substrate A) as used in Example 1 was provided thereon with the same recording layer. However, no surface layer was provided.

COMPARISON EXAMPLE 2

Example 1 was repeated, provided that the surface layer had a thickness of 0.5 microns.

EXAMPLE 2

As the substrate use was made of an injection-molded substrate (Substrate B) of 20 cm in diameter, 1.2 mm in thickness and PMMA (MFI=10).

Then the following ingredients:

| Tetraethylhydrochloric acid | 4.2 parts |
| Ethyl alcohol | 43 parts |
| Ethyl acetate | 42 parts |
| Concentrated hydrochloride acid | 5.4 parts |
| Ethylene glycol | 5.4 parts | were mixed together to prepare a colloidal dispersion of 50 to 80 Å, which was in turn diluted with n-propanol into a coating liquid.

The substrate had been provided therein with a concentrical array of pregrooves, each being 0.07 microns in depth and 0.8 microns in width, at a pitch of 2.5 microns.

That coating liquid was spinner-coated on the substrate, which was treated at 60° C. for 30 minutes to prepare an underlying layer found to have a thickness of 0.01 micron.

Subsequently, a coating liquid comprising an 1% dye solution of Dye D-10 and Quencher Q3-8 (5:2) [dichloroethane, dichlorohexanone (6:5)] was applied on the underlying layer by means of spinner-coating to prepare a recording layer found to have a film thickness of 0.06 microns.

Furthermore, the recording layer was spinner-coated thereon with the aforesaid colloidal dispersion which had been again diluted with n-hexane to prepare a surface layer found to have a thickness of 0.01 micron.

EXAMPLE 3

Under the conditions similar to those of Example 2, a recording layer was prepared, comprising Dye D-2 and Quencher Q3-8 in a proportion of 5:2. The surface and underlying layers were the same as those in Example 2.

EXAMPLE 4

A sample was prepared under the conditions similar to those of Example 2.

However, the surface, recording and underlying layers had a thickness of 0.08, 0.07 and 0.02 microns, respectively.

EXAMPLE 5

Under the conditions similar to those of Example 2, a recording layer was prepared, wherein a coumarone-indene resin having a number-averaged molecular weight of 730 (V-120 manufactured by Nittetsu Kagaku Co., Ltd.) was added to the dye in an amount of 10 wt% based on the entire composition. That layer was found to have a thickness of 0.06 microns. The surface and underlying layers were the same as those of Example 2.

EXAMPLE 6

Under the conditions similar to those of Example 2, a recording layer of 0.06 microns were provided, using as the dye Combination SD1. The surface and underlying layers were the same as in Example 2.

COMPARISON EXAMPLE 3

Using the same recording layer as in Example 2, a sample was prepared, provided that only an underlying layer was provided without any surface layer.

COMPARISON EXAMPLE 4

A sample was prepared which was formed of only a recording layer and was not provided with any underlying layer or surface layer.

COMPARISON EXAMPLE 5

In the sample of Example 2, the surface layer was changed to a SiO$_2$ deposited film of 0.02 microns in thickness.

As illustrated in FIG. 3, a pair of the samples obtained in each of these Examples and Comparison Examples were integrated, with the recording layers 2 and 2' facing each other through the spacers 5 and 5', into a disk of the so-called air-sandwich structure. In each case, the recording layer 2 was spaced away from 2' by 0.6 mm.

With the use of each disk, measurement was made of the reflectance from the back surface sides of the substrates 1 and 1' at 830 nm.

Using a 830 nm-semiconductor laser, writing was done from the back surface sides of the substrates, and the inverse number of the minimum pulse width (ns) where a reflection level ratio (extinction ratio) of 2 was obtained was measured as a function of sensitivity.

Furthermore, measurement was made of C/N ratios at 830 nm and a band width of 30 KHz with a spectrum analyzer manufactured by Hewlett Packard Co., Ltd.

The results are set forth in Table 1.

While each disk was turned at 1200 rpm, recording was made from the back surface sides of the substrates at a power of 10 mW and a recording rate of 3 MHz with a 830 nm-semiconductor laser. Thereafter, reproduction or reading was done from the back surface sides of the substrates at a power of 0.5 mW to measure the reproduction output level on an oscilloscope. The measurements are given as the relative values with respect to Comparison Example 2.

TABLE 1

| | | Film Thickness (μm) | | | | | | |
|---|---|---|---|---|---|---|---|---|
| | Substrate | Surface Colloidal particle coating dispersion | Recording Layer | Underlying Colloidal particle coating dispersion | Reflectance (%) | C/N (dB) | Sensitivity ($\times 10^{-3}$ns$^{-1}$) | Reproduction Output Level (relative value) |
| Example 1 | A | 0.01 | 0.06 D2 + Q3-7 | — | 32 | 49 | 10 | 1.8 |
| Comparison Example 1 | A | — | 0.06 D2 + Q3-7 | — | 31 | 48 | 10 | 1 |
| Comparison Example 2 | A | 0.5 | 0.06 D2 + Q3-7 | — | 30 | 47 | 4 | 1.7 |
| Example 3 | B | 0.01 | 0.06 D10 + Q3-8 | 0.01 | 31 | 48 | 10 | 1.9 |
| Example 4 | B | 0.01 | 0.06 D2 + Q3-8 | 0.01 | 36 | 49 | 11 | 2.0 |
| Example 5 | B | 0.008 | 0.07 D10 + Q3-8 | 0.02 | 30 | 48 | 9.5 | 1.8 |
| Example 6 | B | 0.01 | 0.06 D10 + Q3-8 + resin | 0.01 | 30 | 48 | 9.5 | 1.9 |
| Example 7 | B | 0.01 | 0.06 SD1 | 0.01 | 28 | 50 | 10 | 1.8 |
| Comparison Example 3 | B | — | 0.06 D10 + Q3-8 | 0.01 | 31 | 48 | 5.0 | 0.9 |
| Comparison Example 4 | B | — | 0.06 D10 + Q3-8 | — | 5 | — | — | — |
| Comparison Example 5 | B | 0.02 SiO$_2$ deposited film | 0.06 D10 + Q3-8 | 0.01 | 30 | 48 | 5.0 | 1.3 |

The effect of the present invention will clearly be appreciated from the results given in Table 1.

In other words, a comparison of Example 1 with Comparison Example 1 indicates that writing sensitivity, reading output level and S/N ratio are improved due to the presence of the surface layer.

A comparison of Examples 2 to 6 with Comparison Examples 3 and 4 indicates that the provision of the underlying layer serves to improve reflectance while preventing the PMMA substrates from being attacked and, coupled to the presence of the surface layer, serves to improve writing sensitivity and S/N ratios.

What is claimed is:

1. An optical recording medium susceptible of being read and written on by the formation of pits in the recording layer thereof comprising a recording layer formed of a dye or dye composition on a substrate, characterized in that the medium further comprises on the recording layer a surface layer formed of a coating of a colloidal particle dispersion of a silicon based condensate which surface layer is capable of enhancing the writing sensitivity of the optical recording medium.

2. The optical recording medium of claim 1 wherein the substrate is substantially transparent to writing light and reading light.

3. The optical recording medium of claim 1 wherein the substrate is of a resin.

4. The optical recording medium of claim 3 wherein the resin is an acrylic resin or polycarbonate resin.

5. The optical recording medium of claim 1 wherein the thickness of the surface layer is 50 to 300 Å.

6. The optical recording medium of claim 1 wherein the thickness of the recording layer is 400 to 1200 Å.

7. The optical recording medium of claim 1 wherein the dye is a cyanine dye or phthalocyanine dye.

8. The optical recording medium of claim 1 wherein the recording layer is formed of a dye composition comprising a dye and a resin.

9. The optical recording medium of claim 8 wherein the dye is a cyanine dye or phthalocyanine dye.

10. The optical recording medium of claim 1 wherein the recording layer is formed of a dye composition comprising a dye and a quencher.

11. The optical recording medium of claim 10 wherein the dye is a cyanine dye.

12. The optical recording medium of claim 1 wherein the quencher forms an ionically bonded compound with the dye.

13. The optical recording medium of claim 12 wherein the dye is a cyanine dye.

14. The optical recording medium of claim 2 wherein writing and reading are carried out from the back surface side of the substrate.

15. The optical recording medium of claim 14 wherein no reflective layer overlies the recording layer.

16. The optical recording medium of claim 1 which comprises an underlying layer on the substrate and has the recording layer on the underlying layer.

17. The optical recording medium of claim 16 wherein the underlying layer is formed of a coating of a colloidal particle dispersion of a silicon base condensate and the substrate is of a resin.

18. The optical recording medium of claim 17 wherein the resin is an acrylic resin or polycarbonate resin.

19. The optical recording medium of claim 17 wherein the thickness of the underlying layer is 50 to 500 Å.

20. The optical recording medium of claim 19 wherein the thickness of the surface layer is 50 to 300 Å.

21. The optical recording medium of claim 20 wherein the thickness of the recording layer is 400 to 1200 Å.

22. The optical recording medium of claim 17 wherein the dye is a cyanine dye or phthalocyanine dye.

23. The optical recording medium of claim 17 wherein the recording layer is formed of a dye composition comprising a dye and a resin.

24. The optical recording medium of claim 23 wherein the due is a cyanine dye or phthalocyanine dye.

25. The optical recording medium of claim 17 wherein the recording layer is formed of a dye composition comprising a dye and a quencher.

26. The optical recording medium of claim 25 wherein the dye is a cyanine dye.

27. The optical recording medium of claim 17 wherein the quencher forms an ionically bonded compound with the dye.

28. The optical recording medium of claim 27 wherein the dye is a cyanine dye.

29. The optical recording medium of claim 17 wherein writing and reading are carried out from the back surface side of the substrate.

30. The optical recording medium of claim 29 wherein the substrate is substantially transparent to writing light and reading light, and no reflective layer overlies the recording layer.

* * * * *

UNITED STATES PATENT AND TRADEMARK OFFICE
CERTIFICATE OF CORRECTION

PATENT NO. : 4,735,889

DATED : April 5, 1988

INVENTOR(S) : KENRYO NAMBA ET AL

It is certified that error appears in the above-identified patent and that said Letters Patent is hereby corrected as shown below:

Column 38, line 15, please change "due" to -- dye --.

Signed and Sealed this

Twenty-ninth Day of November, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,735,889
DATED : April 5, 1988
INVENTOR(S) : NAMBA ET AL

It is certified that error appears in the above-identified patent and that said Letters Patent is hereby corrected as shown below:

Column 33, line 54, "hydrochloride" should read --hydrochloric--.

Column 34, line 15, "hydrochloride" should read --hydrochloric--.

Signed and Sealed this

Sixteenth Day of April, 1991

Attest:

HARRY F. MANBECK, JR.

Attesting Officer

Commissioner of Patents and Trademarks